March 17, 1953 G. G. LIGHT 2,632,044
TELEGRAPH REPERFORATOR SWITCHING SYSTEM
Filed July 8, 1946 12 Sheets-Sheet 2

INVENTOR
G. G. LIGHT
BY *T. R. Marsh*
ATTORNEY

March 17, 1953 G. G. LIGHT 2,632,044
TELEGRAPH REPERFORATOR SWITCHING SYSTEM
Filed July 8, 1946 12 Sheets-Sheet 3

INVENTOR
G. G. LIGHT
BY *Marsh*
ATTORNEY

March 17, 1953 — G. G. LIGHT — 2,632,044
TELEGRAPH REPERFORATOR SWITCHING SYSTEM
Filed July 8, 1946 — 12 Sheets-Sheet 7

INVENTOR
G. G. LIGHT
BY M. R. Marsh
ATTORNEY

INVENTOR
G. G. LIGHT
BY M.R. Marsh
ATTORNEY

March 17, 1953 — G. G. LIGHT — 2,632,044
TELEGRAPH REPERFORATOR SWITCHING SYSTEM
Filed July 8, 1946 — 12 Sheets-Sheet 12

INVENTOR
G. G. LIGHT
BY *M. R. Marsh*
ATTORNEY

Patented Mar. 17, 1953

2,632,044

UNITED STATES PATENT OFFICE 2,632,044

TELEGRAPH REPERFORATOR SWITCHING SYSTEM

George G. Light, White Plains, N. Y., assignor to The Western Union Telegraph Company, New York, N. Y., a corporation of New York Application July 8, 1946, Serial No. 681,860

36 Claims. (Cl. 178—2)

This invention relates to telegraph systems and particularly to telegraph switching systems employing reperforator storing and repeating equipment.

In general terms, the object of this invention is to provide an improved telegraph reperforator switching system whereby telegraph messages may be more expeditiously and economically relayed through a telegraph switching office or relaying station.

In a number of reperforator switching systems proposed heretofore, such as for example the system described in the patent to Wheeler et al. No. 2,193,810, granted March 19, 1940, manually selective switching arrangements including plugs and jacks are employed to enable receiving circuits to be extended to desired sending circuits. In systems of the Wheeler et al. type, all receiving circuits terminating at a switching office have associated therewith code signal storage devices which operate to store the signals received at the switching office in perforated tapes. The perforated tapes control associated tape transmitters and the output circuit of the transmitters terminates in a plug. In the operation of such a system the attendant, after noting the destination of a message in a storage tape, by means of the plug and the proper jack connects the transmitter to the desired outgoing or sending circuit. If the outgoing circuit is idle at this time, transmission thereto begins, whereas if the circuit happens to be busy, transmission thereof is delayed until the circuit does become idle. After one message is completely transmitted to the outgoing circuit, the transmitter is automatically stopped by circuits controlled by an end-of-message signal in the storage tape and the attendant may then remove the plug from the jack preparatory to another "plugging up" operation in accordance with the destination of the next message stored in the storage tape. In such a system it is obvious that to effect the switching or relaying of a message through a switching center, the attendant has two distinct operations to perform: inserting the plug into the jack assigned to the proper outgoing circuit, and after the transmission of the complete message, the removal of the plug from the jack. It is a feature of the present invention to provide manually operable selective switching circuits and equipment including push buttons and rotary switches in place of plugs and jacks adapted to operate selectively and in such a manner that a minimum of time and effort of the attendant is required to relay a message through the switching center.

In the proposed system the attendant on observing the destination of the message in the storage tape operates a push button assigned to the desired outgoing circuit and at the completion of the transmission of the message to the outgoing circuit, the restoration of the circuits to their normal condition is automatic and requires no effort on the part of the attendant whatsoever. Since an attendant in the system disclosed herein has fewer duties to perform for the switching of a message through the switching center, other things being equal, the attendant can perform more switching operations in a given time.

A feature of the invention resides in the employment of a plurality of rotary switches in such a manner that the number of connections available to a tape transmitter, or the number of sending circuits to which a transmitter may be connected, is increased to some multiple of the number of connections capable of being established by a single rotary switch.

It often happens that some of the incoming circuits at a switching center are at times very heavily loaded in that the messages received thereover follow one another without any appreciable time interval separating the same. In such cases even though the selective switching equipment may require but a short interval of time to complete its function after the operator has noted the destination of the message, these delays are accumulative and may cause a number of untransmitted messages to be stored in the storage tape of the busy receiving circuit and as long as the circuit remains busy, these messages continue to accumulate. To eliminate this possibility, the present invention employs a so-called alternator which operates in such a manner that the incoming circuit at the end of messages is shifted back and forth between two reperforator mechanisms and thus enables the storage of messages from a single receiving circuit in two storage tapes. With this arrangement the two storage tapes will have alternate messages therein. While a receiving circuit may be operating at its full capacity with the above pointed out disadvantage of causing the accumulation of messages in a storage tape at the central office, such a circuit may not be as heavily loaded during other periods. Accordingly, a three-position control switch for the alternator is provided whereby the operation of the switch into any one of three positions causes the messages received over the associated receiving circuit to all be stored in one storage tape or the other, or to be stored alternately in both storage tapes.

To facilitate the tracing of messages relayed through a reperforator switching center, each message as it is transmitted over a sending circuit usually has a service number and certain other information automatically appended thereto by means of an automatic message numbering machine of the type disclosed in the patent to Dirkes et al. No. 2,193,809, granted March 19, 1940. In the system disclosed herein there is provided one or more printing devices at the switching center which will print the numbers appended to the outgoing messages along with a part, such as the first line of the messages which include the originating point and destination thereof. These so-called monitoring printers which function to automatically record the first line of each message relayed through or transmitted from the switching center are arranged in a so-called concentrator arrangement in such a manner that if the first monitor printer assigned to a group of lines is recording the first line of a message, the next printer will record the first line of a second message switched through the center during the recording operation at the first monitor printer. With this arrangement the first monitor printer will record the first lines of all messages switched during idle periods thereof, and the capacity of the switching center is not limited to the speed of operation of the monitor printers.

Still another feature of this invention resides in the provision of an improved and simplified arrangement and circuits for reading the characters as they are transmitted through a switching circuit for effecting the desired controls, such as the stopping of further transmission from a transmitter following the transmission of an end-of-message signal. In this respect the reading arrangement herein disclosed employs but two relays instead of the usual five and the tape transmitter employed in conjunction therewith is arranged so that the contacts thereof do not interrupt electric currents which thereby effects reduction in contact deterioration of the transmitter.

Other advantages and features of the invention will appear hereinafter in the following description of one embodiment thereof shown in the accompanying drawings wherein:

Fig. 13 is a diagram showing how Figs. 2 to 12, inclusive, may be arranged to form a complete circuit diagram of a receiving and a sending circuit as embodied in a system comprising the present invention.

General description

Figure 1:
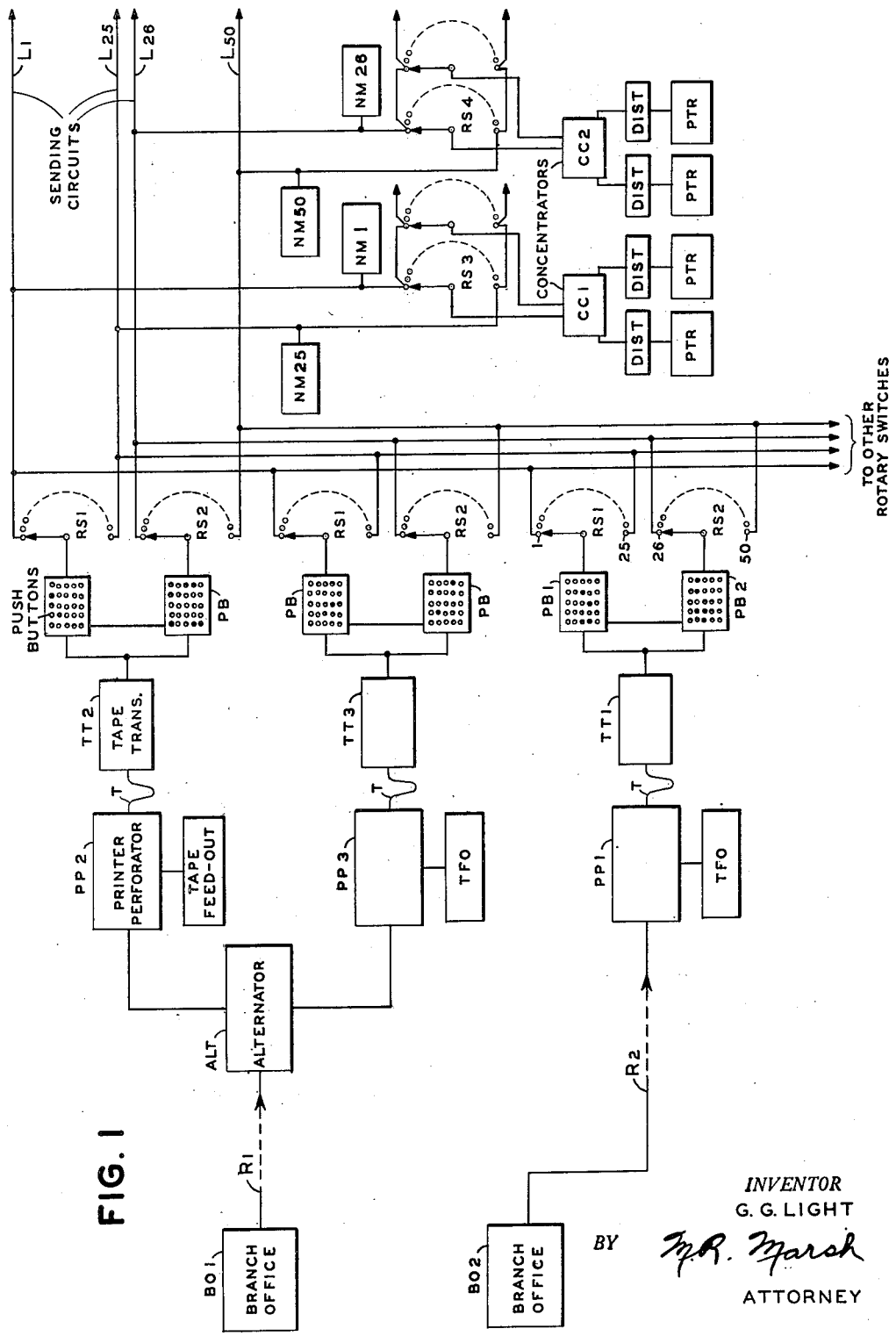
Fig. 1 is a diagrammatic view of the general arrangement of a system embodying the present invention.

Referring first to Fig. 1, two branch offices BO1 and BO2 are shown connected to the central office by means of receiving circuits R1, R2. As shown, the receiving circuit R2 terminates in a printer perforator PP1, which responds to the signals received over the receiving circuit and stores such signals in a tape T. In the preferred embodiment of the invention, the printer perforator PP1 prints characters representing the received signals on the tape T as well as perforating the tape in accordance therewith, and may be of the type disclosed in the patent to Dirkes et al. No. 2,174,731, granted October 3, 1939. The storage tape T prepared by the printer perforator PP1, passes to and controls a tape transmitter TT1 which operates to cause signals corresponding to the characters stored in the tape to be transmitted over a sending circuit when connection to a sending circuit is established.

To establish connection from the transmitter to the desired sending circuit, a plurality of push buttons and rotary switches are employed. In the embodiment of the invention described herein, the push buttons are grouped into groups of twenty-five each with each group being arranged to operatively control an associated rotary switch. The two groups of push buttons associated with the tape transmitter TT1 are identified as PB1 and PB2 and have associated rotary switches RS1 and RS2, respectively. The points of the rotary switches RS1 and RS2 are connected to the sending circuits extending from the central office and are identified as L1 to L50. By operating a push button of the groups PB1 and PB2 the tape transmitter TT1 is connected to the sending circuit assigned to the operated push button and transmission of the message stored in the tape T will be initiated automatically if the selected sending circuit is idle or as soon as it becomes idle if it should be busy at the time of operation of the push button.

When there are no other messages received on the printer perforator PP1 within a predetermined period following the end-of-message signal of a received message, a tape feed-out arrangement TFO automatically causes a sufficient length of tape T to be fed out of the printer perforator to permit the last message character to reach the sensing pins of the tape transmitter.

The receiving circuit R1 terminates at the central office in an alternator ALT which has a manually operable switch associated therewith whereby the alternator functions to direct the messages received over R1 alternately to printer perforators PP2 and PP3 or to direct all messages to either one of the two printer perforators. Printer perforators PP2 and PP3 prepare tapes T for associated transmitters TT2 and TT3 each of which have groups of push bottoms and rotary switches arranged in substantially the same manner as those associated with tape transmitter TT1.

The points of the rotary switches RS1 and RS2 associated with tape transmitters TT2 and TT3 are connected in multiple with each other and with the points of the rotary switches associated with transmitter TT1 so that the operation of the appropriate push button of any group connects the associated transmitter to the desired sending circuit L1 to L50.

Numbering machines NM1, NM25, etc., are connected to each of the sending circuits L1 to L25. etc. and operate to transmit over their respective sending circuits message numbers accompanying each message. Also connected to the sending circuits are the points of rotary switches RS3 and RS4. These rotary switches are so arranged that when a connection is made from a tape transmitter TT to a sending circuit L, the rotary switches also connect to such a line, through concentrators CC1 and CC2, one of a group of monitor printers such as those identified as PTR. As long as a monitor printer is connected to a sending circuit L it will record or copy the signals sent over the sending circuit and the copied signals will include those sent from a message numbering machine such as NM1. Besides the message number, the monitor printers are adapted to also copy the first line of each message. Since the point of origin and the address of a message are included in the first line thereof, this information, together with the signals from the numbering machines give a readily available printed record of each switching operation. After copying the first line of a message, the connected monitor printer is released to permit connection thereof to another sending circuit. The concentrators CC1 and CC2 function in the usual manner to connect the lowest numbered idle monitor printer PTR to a sending circuit when a connection is established thereto. The number of monitor printers PTR associated with a concentrator such as CC1 is governed by the traffic density over a group of lines such as L1 to L25 to which the concentrator may be applied.

*Alternator*

Figure 2:
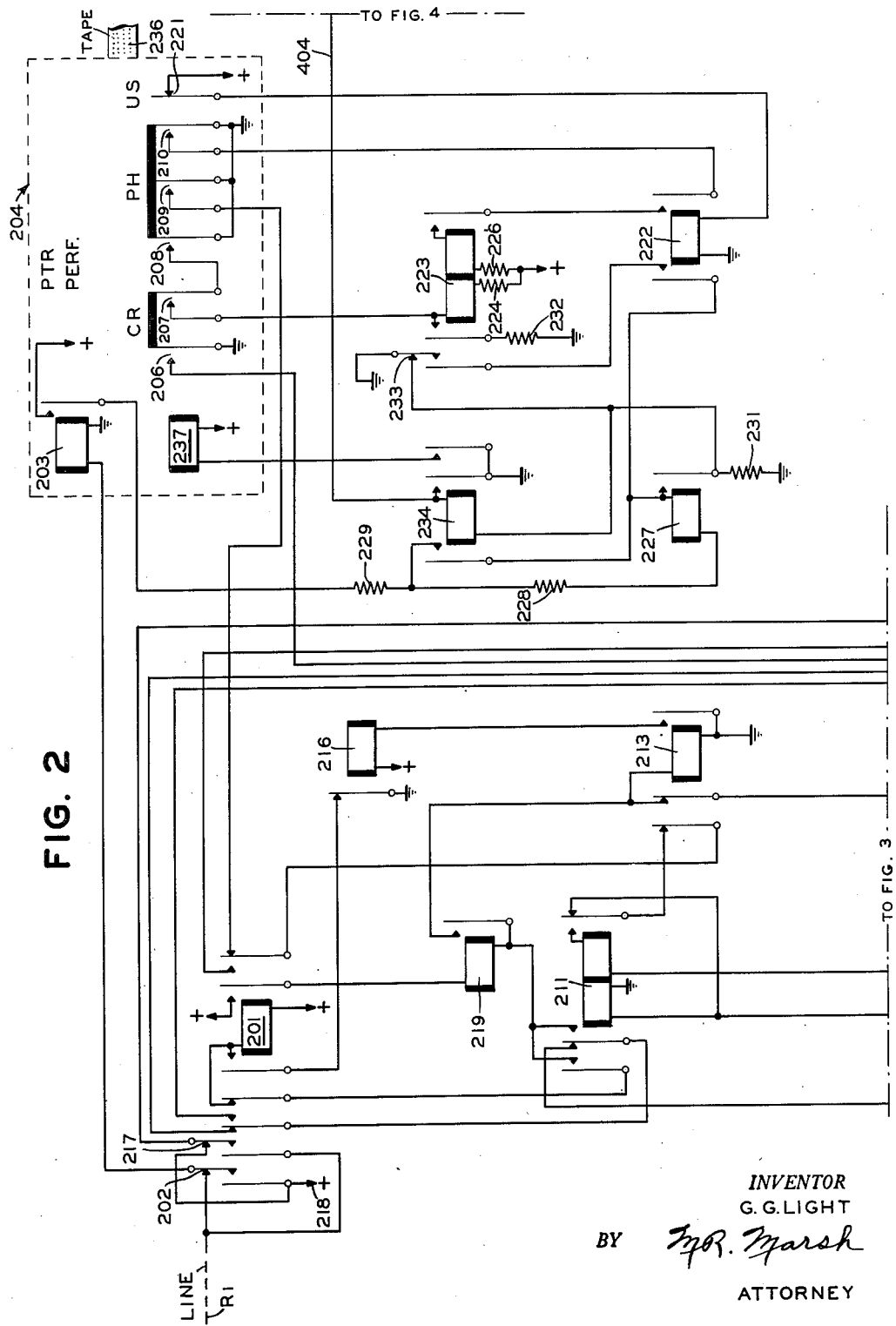
Figs. 2 and 3 are detailed circuit diagrams of the alternator arrangement embodied in the invention.

The so-called alternator operates to connect two printer-perforators alternately to a receiving circuit whereby these printer-perforators receive alternate messages. A manually operable switch included in the alternator circuit is effective to disable the same and thereby permit either one or the other of the two printer-perforators to be selected to receive all messages. As shown in Fig. 2 the receiving circuit R1, with a transfer relay 201 in a deenergized condition, extends through contacts 202 to the selecting magnet 203 of the printer-perforator 204. The printer-perforator 204 is shown diagrammatically and may be of any suitable type such as, for example, that shown in Patent 2,174,731, granted October 3, 1939, to R. F. Dirkes et al., or Patent 2,143,828, granted January 10, 1939, to R. F. Dirkes et al. The first of these patents discloses a combination telegraph printer and perforater adapted for use with start-stop signals while the latter discloses a similar instrument arranged for use with multiplex signals. Since the system as described herein is arranged for use in a start-stop system, the instrument covered by Patent 2,174,731 is best adapted for use in the present system.

The printer-perforator 204 includes a plurality of selectively operable sets of contacts which may be operated in accordance with the disclosure of Patent 2,143,828 and includes sets identified as CR, PH, and US. The CR contacts include individual sets 206 and 207 and are adapted to close when the CR or carriage return signal is received on the printer-perforator. The PH or punch hammer contacts including individual contact sets 208, 209 and 210, are normally open and are momentarily closed by means of a suitable link operated by the punch hammer which is actuated once during each cycle of operation of the printer-perforator. The US or unshift contacts are normally closed and open during receipt of a letters combination.

In the present system each message is terminated by an end-of-message signal which comprises two carriage return combinations followed by a letters combination. It is the end-of-message signal which in the manner described hereinafter operates the transfer relay 201 to transfer the receiving circuit R1 from the printer-perforator 204 to printer-perforator 304 when the manually operable switch 301 is in its mid-position. Similarly if the printer-perforator 304 is connected to the receiving circuit R1, the end-of-message signal following a message received on this printer-perforator effects release of transfer relay 201 to transfer the receiving circuit back to printer-perforator 204.

With the transfer relay 201 in its released position the receipt of a carriage return combination will close contacts 206 on the printer-perforator 204. The closure of these contacts completes a circuit from ground through the lower contacts 302, which are closed with the switch 301 in its mid-position, the back contact and third left hand tongue of transfer relay 201, a tongue and back contact of relay 211, the coil of relay 300 and a back contact and tongue of relay 305 to battery. This circuit causes energization of relay 303 and contacts 209 of the punch hammer set, which will also be closed at this time, apply ground through the back contact and outer right hand tongue of relay 201, the outer left hand tongue and back contact of a relay 213, the right hand tongue and back contact of relay 211 to the tongue of relay 300 which is permanently grounded through the left hand coil of relay 211. With relay 300 at this time energized, the above grounded circuits are extended through the coil of this relay to battery, but as long as contacts 209 remain closed, relay 211 remains deenergized by virtue of the short-circuiting ground through contacts 209. However, as soon as contacts 209 open at the end of this cycle of operation of the printer-perforator 204 to remove the short-circuiting ground, relay 211 will become energized and this relay, together with relay 300, will be locked up by a circuit through the coils thereof. Thus in response to the first carriage return character of an end-of-message signal, relays 211 and 300 are energized and locked up.

If the next received character on the printer-perforator 204 is any character other than a carriage return, only the contacts operated by the punched hammer will be closed. In this event, the closure of contacts 209 establishes a circuit from ground through the back contact and outer right-hand tongue of relay 201, the outer left-hand tongue and back contact of relay 213, the right-hand tongue, front contact and left-hand coil of relay 211, and through the coil of relay 305 to potential. This circuit causes the energization of relay 305 which in turn opens the locking circuit through the coils of relays 300 and 211 whereupon said relays release. The release of these relays returns the associated circuits to their normal condition or the condition they were in prior to the receipt of the first carriage return.

If the character immediately following the first carriage return is another carriage return, the second closure of contacts 206 establishes a circuit for the energization of relay 201. This circuit extends, as described, to the third left-hand tongue of relay 201 and thence via the left-hand tongues and front contacts of relay 211, the second left-hand tongue and back contact of relay 201 and through the coil of this relay to potential. When relay 201 is operated by the above circuit, it locks up by a circuit including its coil and first left-hand tongue and front contact and a back contact of a relay 216. The inner left-hand tongue of relay 201 is arranged in the well known manner to engage its front contact when the relay is energized and operates before the other tongues leave their back contacts.

The operation of relay 201 through its two outer left-hand tongues and contacts 202 and 217 transfers the receiving circuit R1 from the selecting magnet 203 of the printer-perforator 204 to the selecting magnet 303 of the printer-perforator 304. Concomitantly these tongues and contacts remove the holding potential 218 from the coil of the selecting magnet 303 of printer-perforator 304 and apply it to the selecting magnet 203 of printer-perforator 204.

The closure of the punch hammer contacts 209 concomitantly with the closure of contacts 206 in response to the second carriage return effects release of relays 211 and 300 in the manner described.

The first carriage return of the end-of-message signal of the next message which will be received on printer-perforator 304 will cause energization of relay 300 since the operation of relay 201 transfers the operating circuit for this relay to contacts 306 of printer perforator 304. The operation of relay 201 also transfers the circuit from punch hammer contacts 208 of printer perforator 204 to punch hammer contacts 308 of printer perforator 304. Thus, the counting and control relays of the alternator circuit count carriage return signals in substantially the same manner when either one of the printer perforators is connected to the receiving circuit. The second closure of contacts 306, with relay 211 operated, establishes a circuit through the inner left-hand tongue and front contact of relay 211 through the coil of relay 219 to potential at the inner right-hand tongue and front contact of relay 201 whereby relay 219 is energized. Simultaneously with the energization of relay 219 the closure of contacts 309 establishes a circuit for the energization of relay 305. Energization of relay 305 through its right-hand tongue places a short-circuiting ground around the coil of relay 213 in parallel with the ground from the carriage return contacts 306. Thus, as long as contacts 306 and 309 remain closed the operation of relay 219 will not cause energization of relay 213. However, when contacts 306 and 309 open, the short-circuiting grounds around the coil of relay 213 are removed and the said relay will become energized by a circuit extending from ground through the coil thereof, the front contact, tongue and coil of relay 219, to potential at the front contact and inner right-hand tongue of relay 201.

Operation of relay 213 through its right-hand tongue completes a circuit for the energization of relay 216 which in operating opens the locking circuit of relay 201 which thereupon releases and restores the circuits controlled thereby to their previous condition with the receiving circuit extending to the selecting magnet 203 of printer perforator 204.

Since the transfer from one printer perforator to the other is effected soon after the receipt of the second carriage return of an end-of-message signal, the actual transfer of the receiving circuit may occur during the receipt of the accompanying letters character. However, the nature of the letters character is such that the partial receipt thereof, on either of the printer perforators will not adversely affect their operation or the operation of the associated control circuits.

The alternator operates in the above described manner to switch successive messages alternately to the printer perforators 204 and 304 with the switch 301 in its midposition. The switch 301 in either of its other two operative positions is effective to disable the alternator circuits and prevent the automatic switching from one printer perforator to the other at the end of a message. If, for example, the receiving circuit R1 is extended to the printer perforator 204, as will be the case when the transfer relay 201 is deenergized, the operation of key switch 301 to such a position as to open the contacts 302 thereof prevents further end-of-message signals from causing operation of the transfer relay 201 and the receiving circuit will therefore remain connected to the selecting magnet 203 of printer perforator 204. Similarly, if the transfer relay 201 happens to be energized, in which condition the receiving circuit is extended to the selecting magnet 303 of printer perforator 304, the operation of key switch 301 to such a position as to open normally closed contacts 311 prevents the end-of-message signal from causing the transfer of the receiving circuit back to the printer-perforator 204. Thus by operating the key switch 301, either one of the printer perforators 204 or 304, which happen to be connected to the receiving circuit, may be selected to remain connected to the circuit or the key switch 301 may be operated so that the transfer will occur at the end of the message being received. In this case the transfer will be to the idle printer-perforator and this printer perforator will receive all following messages.

*Tape feedout control*

Figure 3:
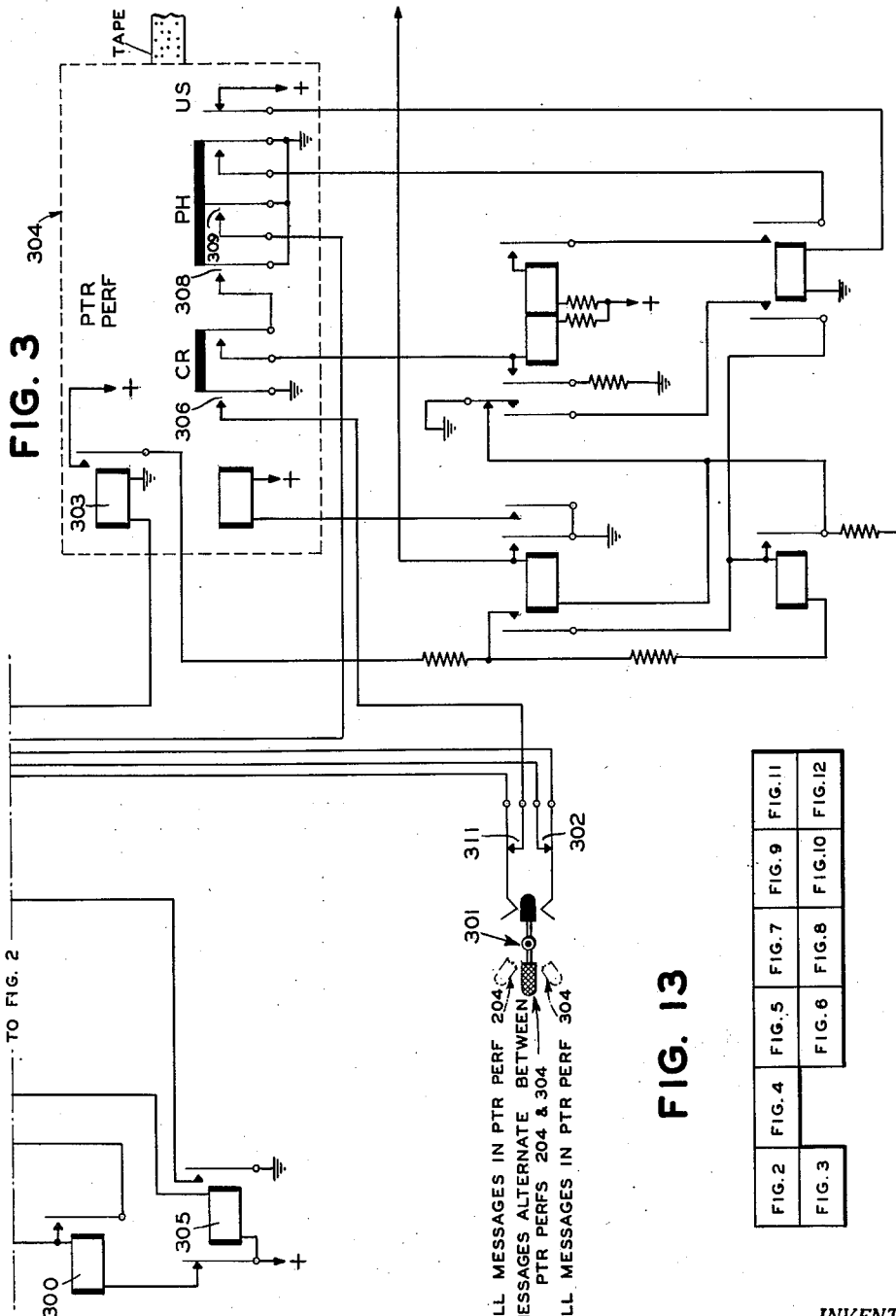

In the preferred arrangement of the system each printer perforator, whether it be one of a pair such as 204 and 304 or one such as PP1, Fig. 1, adapted to receive all the messages incoming over a receiving circuit, has tape feedout circuits associated therewith. The tape feedout arrangement is effective to cause the printer perforator to meter out tape at the end of a received message or after the receipt of the end-of-message signal provided a taut tape condition exists between the printer perforator and its associated tape transmitter. The actual circuits for tape feedout control for printer perforators 204 and 304 are shown in Figs. 2 and 3 and that associated with printer-perforator 204 will now be described.

The purpose of the tape feedout control is to automatically feed out sufficient tape from the printer perforator to enable the last perforated character of the received message to be advanced sufficiently to reach the sensing pins of the associated tape transmitter. The tape feedout employs contacts 207 of the carriage return set, contacts 208 and 210 of the punch hammer set, together with the normally closed unshift contacts 221, all of which are on each printer-perforator. Since the unshift contacts 221 are normally closed, an obvious circuit is normally established to maintain relay 222 in an energized condition. The receipt of the first carriage return of an end-of-message signal completes a circuit through contacts 207 and 208 and the left-hand coil of a relay 223 and a resistance 224 to positive potential. Relay 223 thereupon operates and locks up through a circuit including its inner left-hand tongue. Simultaneously with the completion of the circuit through the left-hand coil of relay 223 and the energization thereof, the closure of contacts 210 completes a circuit through the right hand tongue and right hand coil of relay 223 and resistance 226 to positive potential. The right and left hand coils of relay 223 are arranged in opposition but the relay does not release on completion of the circuits through the two coils thereof in as much as resistance 226 is of higher value than resistance 224, permitting a higher current to flow through the left-hand winding. The operation of relay 223 completes a circuit from ground through the front contact and outer left-hand tongue thereof, the front contact and left-hand tongue of relay 222, through the coil of a relay 227 and resistances 228 and 229 to potential at the tongue and front contact of the selecting magnet 203. The above circuit causes relay 227 to operate, which through its tongue and front contact locks up independently of the contacts of relays 222 and 223. The locking circuit for relay 227 is from ground through a resistance 231 to the tongue of said relay.

Thus, in response to a carriage return signal, relays 222, 223 and 227 will be in an energized condition. On the receipt of the second carriage return of an end-of-message signal, the position of the relays are not changed. However, if either one of the carriage return signals is followed by some character other than a letters character or another carriage return, the relays are released. During receipt of such a character the closure of contacts 210 of the punch hammer set completes a circuit from ground through the right-hand tongue and front contact of relay 222, the right-hand tongue and front contact of relay 223, and resistance 226 to positive potential. The flow of current through the right-hand coil of relay 223 is in opposite direction to the flow through the left-hand coil and the value of resistances 224 and 232 in the locking circuit through the left-hand coil is greater than the value of resistance 226 and hence the greater flow of current in the right-hand coil will cause relay 223 to release. As relay 223 releases, ground is applied through contacts 233 to one side of the coil of a relay 234. This prevents operation of relay 234 should the tape lever controlled by the tape 236 issuing from the printer-perforator 204 happen to be closed at this time. The operation of the tape lever contacts will be described hereinafter.

When a letters character directly follows the two carriage return characters as is the case at the end of a message, the operation of the unshift contacts 221 opens the circuit through relay 222 which releases and in turn opens the circuit through the right-hand coil of relay 223. However, relays 223 and 227 remain energized as the locking circuits thereto are not disturbed. Should the two carriage return signals be followed by more than one letters character, the momentary closing of contacts 221 will cause corresponding energizations of relay 222. Relay 222 in operating will cause reenergization of relay 227 which is released on the start pulse of each character. In this case the characters will be letters, the start pulses of which open the locking circuit to relay 227 at the front contact of the selecting magnet 203. However, since relay 222 causes reenergization of relay 227, the final condition of relay 227 is energized after the receipt of one or more letters characters.

Figure 4:
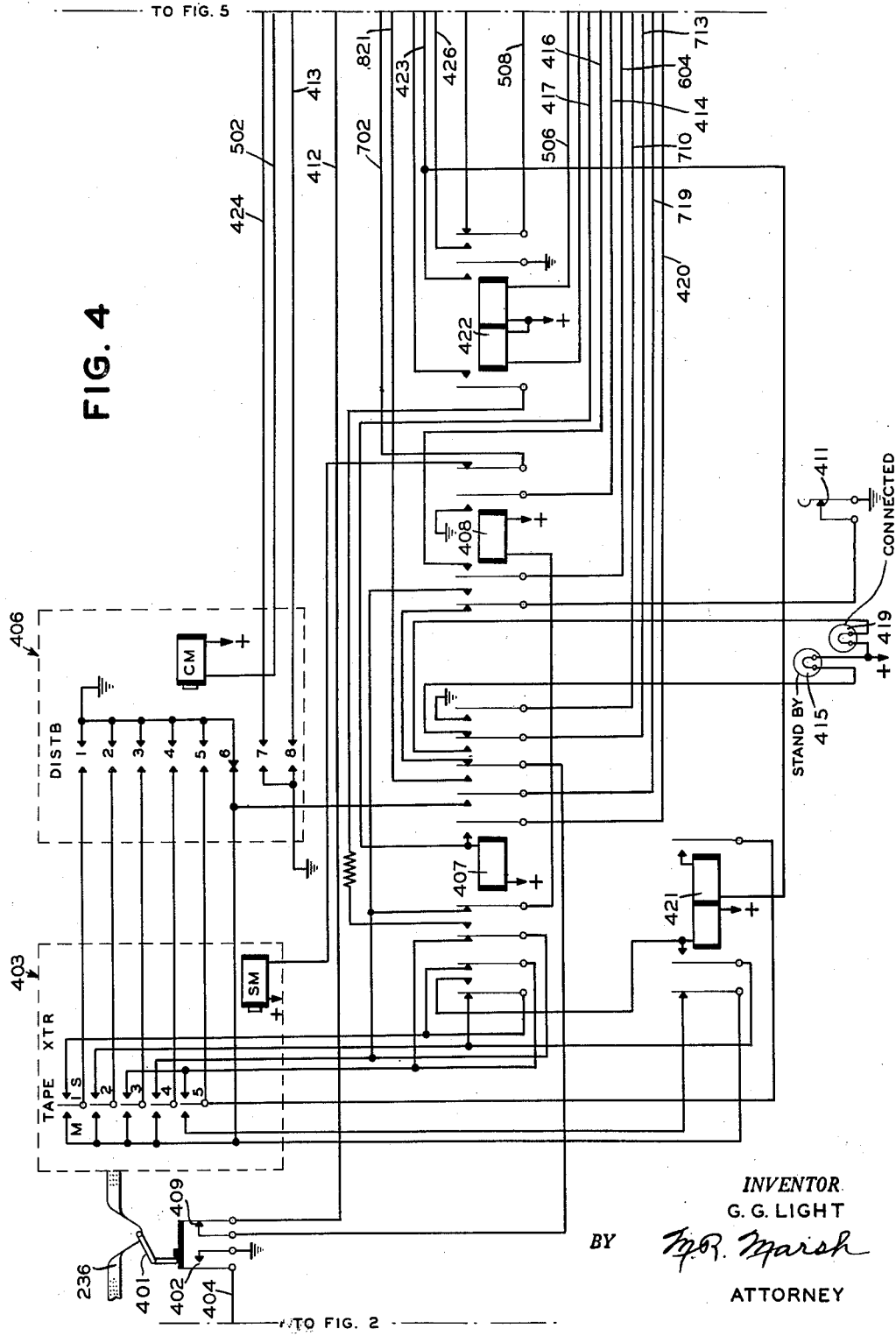
Figs. 4, 5, 6, 7 and 8 are detailed circuit diagrams of the manually operative selective switching means of one repeating circuit included in the system.
Figure 5:
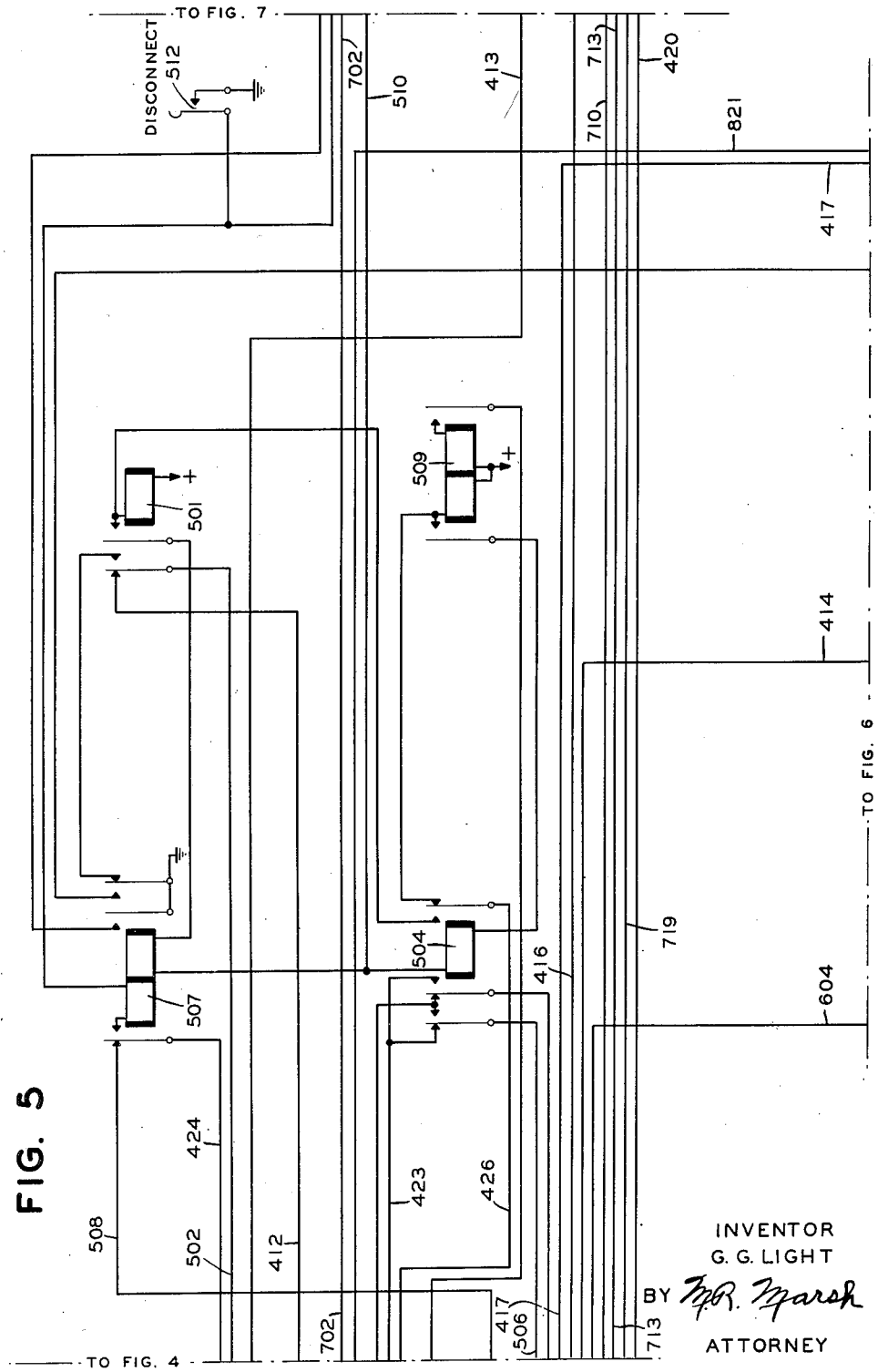
Figure 6:
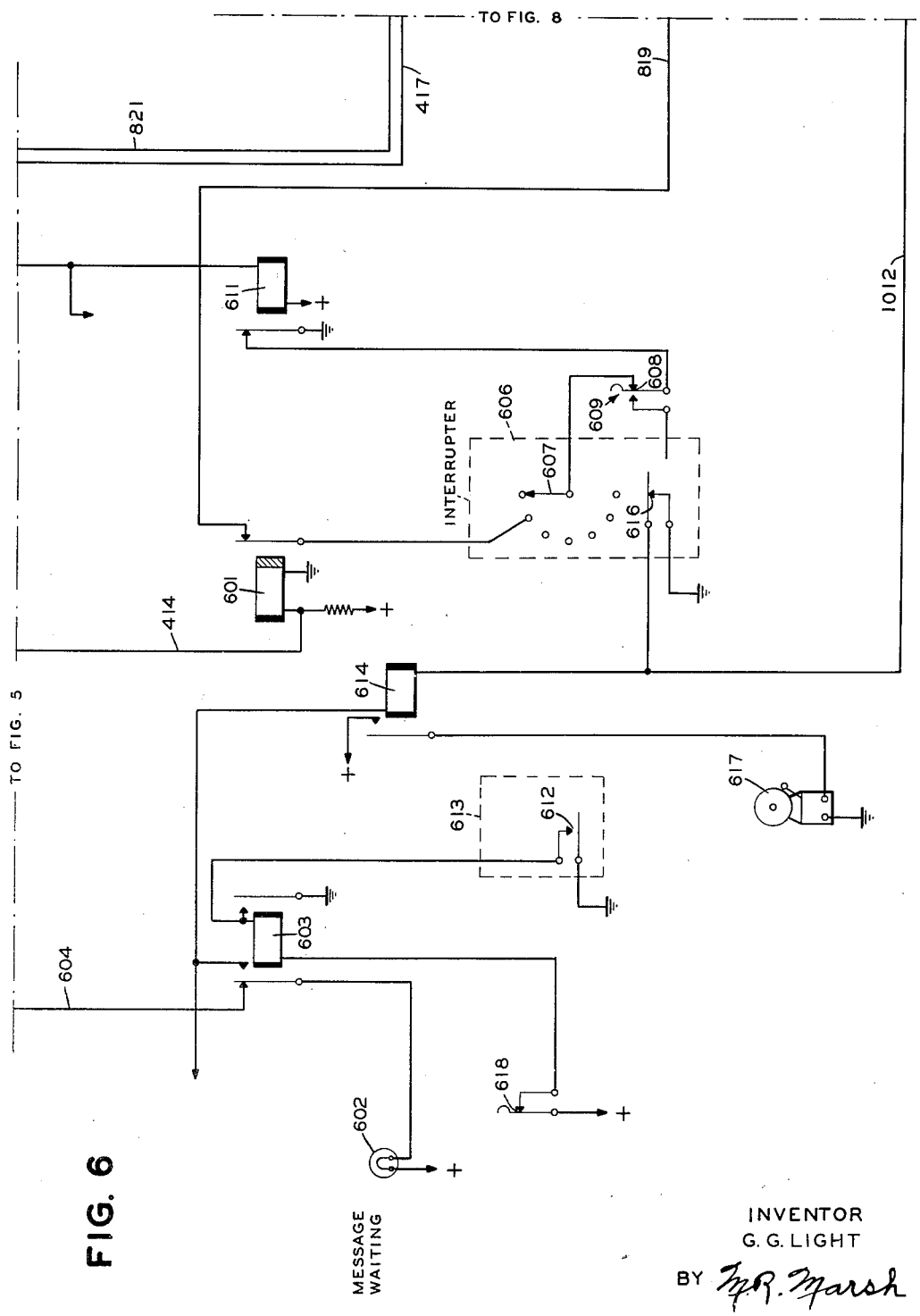

With relay 227 energized, the condition is established for the operation of relay 234 contingent upon the position of the tape lever 401, Fig. 4, controlled by the tape 236. When the tape 236 is not taut, tape lever controlled contacts 402 will be in an open condition, and as the transmitter 403 operates to advance the tape 236 therethrough to reduce the amount of tape between the printer-perforator and the transmitter, the tape lever 401 causes contacts 402 to close. Closing of contacts 402 by a condition of taut tape applies ground over conductor 404 to complete a circuit through the coil of relay 234 to the tongue of relay 227 and thence over the above described circuit to potential at the front contact of the selecting magnet 203. This circuit causes energization of relay 234 whereupon its left-hand tongue short-circuits the coil of relay 227 whereupon said relay releases. The release of relay 227 in turn causes release of relay 234. However, the operation of relay 234 before its release completes a circuit from ground at its outer right-hand tongue, through the coil of a tape feedout control magnet 237 to potential whereby said magnet is energized to initiate a tape feedout operation by the printer-perforator 204. The tape feedout control mechanism initiated into a cycle of operation by energization of magnet 237 may be any of the well known types.

The release of relays 234 and 227 in the manner described prevents a subsequent tape feedout operation until after another message has been received by the printer-perforator 204 and the tape feedout mechanism of the printer-perforator is so arranged that should another message be received during a tape feedout operation, the tape feedout operation will be interrupted and the tape 236 perforated in accordance with received signals. In as much as the tape feedout is initiated in response to a letters character, the selection of which remains set up in the printer-perforator, the tape issuing from the printer-perforator during the tape feedout operation will be perforated with letters characters.

A selective switching circuit is included in the equipment which enables a message stored in a tape, such as tape 236, to be switched to and transmitted over the desired sending circuit. Such equipment is normally provided for each receiving position or each printer-perforator that may store messages in an associated tape. Primarily the equipment of each selective switching circuit includes a tape transmitter, a distributor transmitter, one or more multi-level rotary switches and a like number of groups of push buttons or selecting keys, signal lamps and control relays. Figs. 4 to 8, inclusive, show the details of one such selective switching circuit wherein two rotary switches are employed with two associated groups of controlling push buttons.

The sending circuits over which the stored messages are transmitted terminate on the points of one of the levels of the rotary switches of a selective switching circuit and these points are connected in multiple to corresponding points of the rotary switches of all other selective switching circuits. Assigned to each such point in each selecting circuit is an individual push button, and since it is impractical for obvious reasons to construct a rotary switch with greater than a given number of points, for example, twenty-five points, one such rotary switch is required for each such group of twenty-five stations to which messages may be switched.

The tape transmitter with its associated distributor transmitter is connectable to the wipers of the rotary switches of its associated selective switching circuit, and the depression of any particular push button will cause the tape transmitter and distributor transmitter to be connected through the wipers to the points on the rotary switch associated with the depressed push button.

Thus a message in the tape of any tape transmitter may be directed to any of the outgoing circuits by depressing the proper push button of the selective switching circuit associated with that particular tape transmitter.

In the description of the selective switching circuit shown in the drawings, Figs. 4 to 8, it will be assumed that this circuit is associated with the printer-perforator 204, Fig. 2, and that the tape 236 issuing from the printer-perforator 204 is arranged to control the tape transmitter 403 of this circuit. It will also be assumed that the conductor 404 from the tape lever contacts 402 extends to one terminal of the coil of relay 234. It will be understood that each of the other printer-perforators, such as 304, Fig. 3, and PPI, Fig. 1, has associated therewith similar selective switching circuits.

As described above in connection with the tape feedout circuit, successive messages in a tape are separated by end-of-message signals and if a succeeding message does not follow immediately, sufficient letters characters are perforated in the tape to permit the last intelligence character of a message to be advanced over the pins of the transmitter. Accordingly, in the idle condition of a printer-perforator and assuming there is no message in the tape between a printer-perforator and its associated tape transmitter, the tape between these two units will be taut and consist exclusively of letters perforations. In order that the first character of a message subsequently received on the printer-perforator may reach the pins of the tape transmitter, the selective switching circuit is arranged on slack tape conditions to idle through the transmitter all such letter perforations separating messages. These letter perforations consist of all five intelligence impulses thereof being of marking polarity and the manner in which the selective switching circuit herein disclosed is arranged to idle such letters characters through the transmitter and detect the first character of the subsequent message constitutes one of the novel features of the present invention.

The tape transmitter 403 may be of any suitable type found in the prior art such as, for example, the tape transmitter disclosed in Patent No. 2,172,269, granted September 5, 1939, to H. Angle et al. The transmitter 403 consists essentially of a set of five tongues which are positioned in accordance with the perforations in the control tape 236 to engage either the marking or spacing contacts. When the sensing pin of the transmitter senses a perforation in the tape the tongue engages its marking contact whereas in sensing a non-perforated section in the tape, the tongue engages its spacing contact. A stepping magnet SM periodically energized during the operation of the transmitter advances the tape therethrough. In the circuit about to be described, the five tongues of the transmitter are connected by individual conductors to one terminal of associated contacts 1 to 5 of a distributor transmitter 406, the other terminals of which are grounded. Also included in the distributor are contacts 6, 7 and 8, and during the idle or normal condition of the distributor, contacts 1 to 5 and 7 to 9 are open and contact 6 closed as shown. The distributor 406 also has a clutch magnet CM which when energized in a manner to be described operates a clutch to release a rotatable member for rotation, and during the rotation thereof it actuates the contacts 1 to 8 in a predetermined manner.

The spacing contacts of the tape transmitter 403 are connected, in the manner shown, through back contacts and left-hand tongues of a relay 407 and the coil of relay 408 to potential. Accordingly, as long as the tongues of transmitter 403 remain out of engagement with their spacing contacts, and relay 407 remains deenergized, relay 408 will also remain deenergized. Since the letters combinations in the tape 236 have all marking signaling conditions, relay 408 will remain deenergized as long as such characters appear over the pins of the transmitter 403 or the transmitter remains in an idle condition.

If it is assumed that the tape 236 is taut and has nothing but letters characters therein and that the printer-perforator 204 begins to receive another message and store the same in tape 236, the extra supply of tape will enlarge the tape loop and the tape lever 401 will allow contacts 409 to close. The closure of contacts 409 for the assumed condition completes a circuit to the clutch magnet CM of the distributor 406 and this circuit may be traced from ground through a key 411, a tongue and back contact of relay 408, a back contact and right-hand tongue of relay 407, contacts 409, conductor 412, a back contact and tongue of a relay 501, conductor 502 and through the coil of clutch magnet CM to potential. The clutch magnet will thereupon release the distributor 406 for continuous operation which will continue until the clutch magnet circuit is interrupted. During each cycle of operation of the distributor 406 the closure of contacts No. 8 thereof completes a circuit for the energization of the stepping magnet SM of the transmitter 403. This circuit extends from ground at contact No. 8 over conductor 413, a left-hand tongue and back contact of a relay 701, conductor 702, the outer right-hand tongue and back contact of relay 408 and through the coil of stepping magnet SM to potential. This periodical energization of the stepping magnet SM will effect advancement of the tape 236 with the letters perforations therein through the transmitter 403.

When the first character of the message in the tape reaches the pins of the transmitter 403, one or more of the tongues thereof will engage associated spacing contacts. During the following cycle of operation of the distributor 406 in applying ground to the tongues of transmitter 403 a circuit will be completed for the energization of relay 408. When relay 408 thus operates it will be locked up through a circuit including the inner left-hand tongue and back contact of relay 407, the front contact and second left-hand tongue of relay 408 and key 411. The operation of relay 408 opens the described circuits to the clutch magnet CM of the distributor 406 and the stepping magnet of the tape transmitter 403. In addition, the operation of relay 408 through its inner right-hand tongue applies ground over conductor 414 to the terminal of relay 601 that has battery connected thereto. This short-circuits the coil of slow-to-release relay 601 whereupon said relay, which is normally energized, releases. The opening of the circuit to the clutch magnet CM causes the distributor to come to rest at the end of its current cycle of operation while the interruption of the circuit to the stepping magnet SM prevents the first intelligence character of the message from being advanced out of operative relationship with the pins of the transmitter 403. Another function performed by the energization of relay 408 is the completion of a circuit to the message waiting lamp 602. The latter circuit extends from potential at the lamp 602, through the left-hand tongue and back contact of relay 603, conductor 604, the inner left-hand tongue and front contact of relay 408, conductor 416, the upper tongue and back contact of relay 801, conductor 704, to ground at the back contact and lower tongue of the relay 703. The operator, by means of the illumination of the message waiting lamp 602, is appraised that a message or at least its first part is stored in the tape 236 and is waiting to be switched through the system. The operator thereupon inspects the tape to determine from the printed portion thereof the destination of the message and depresses the proper push button of this selective switching circuit.

Figure 7:
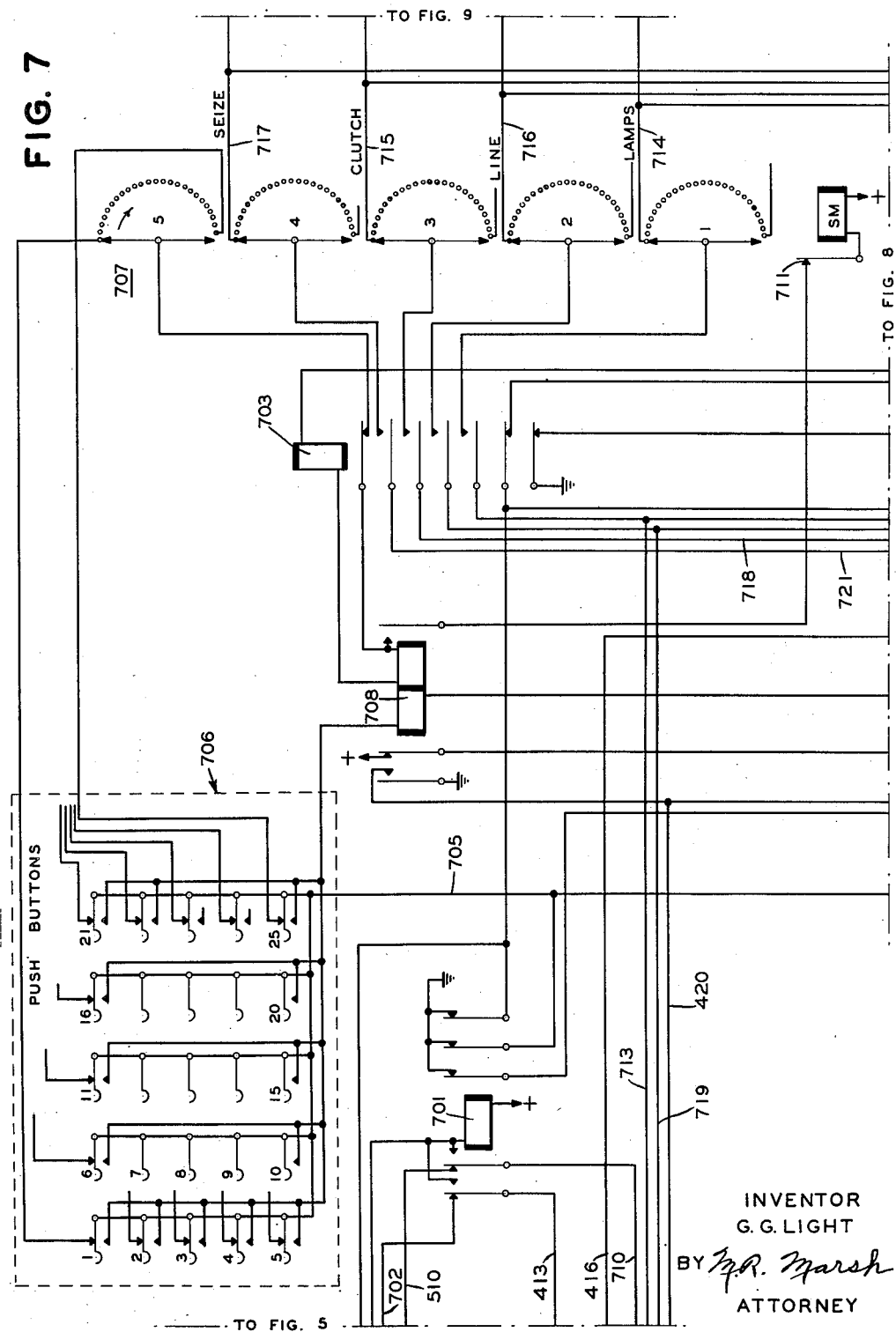
Figure 8:
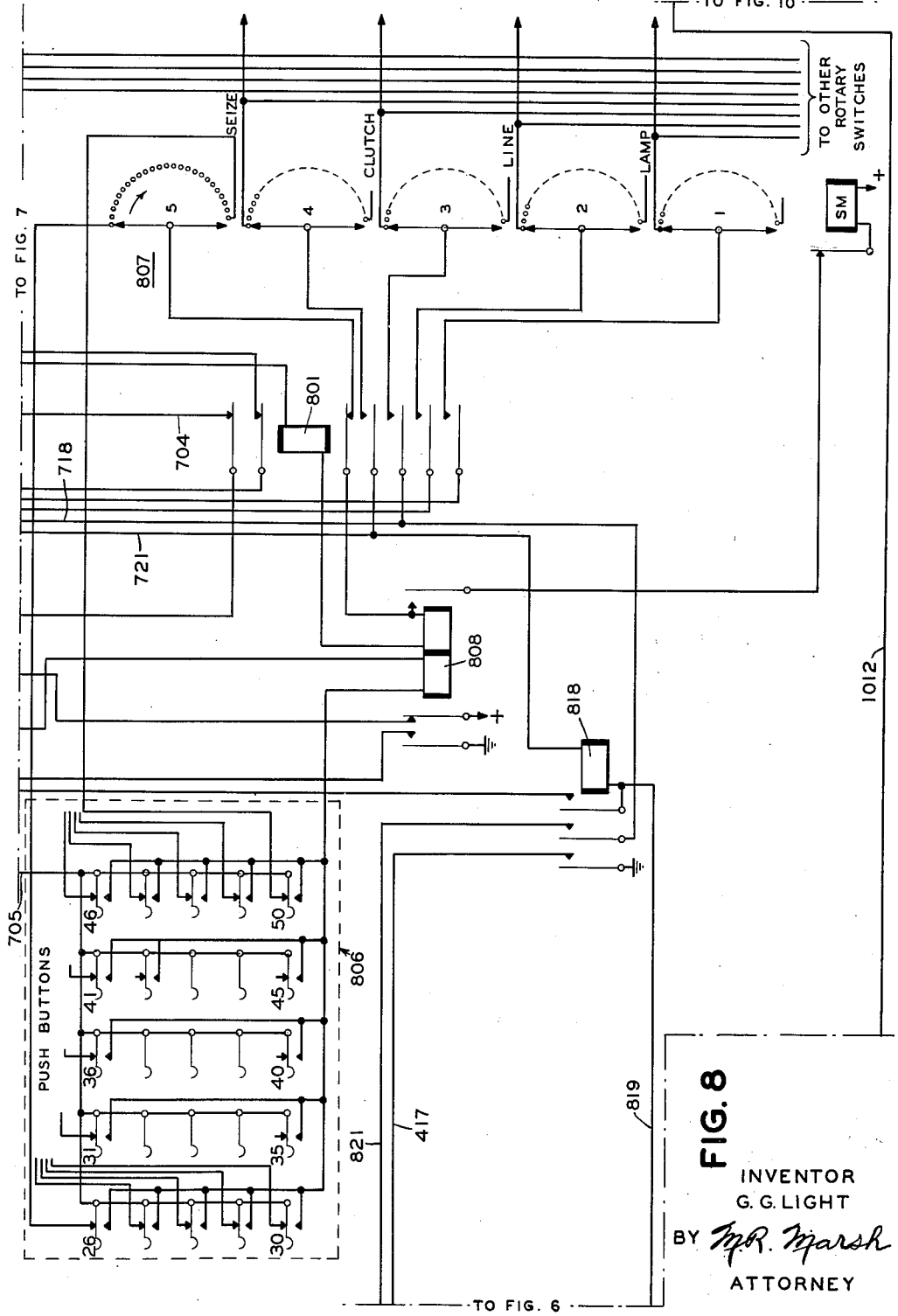

As shown in Figs. 7 and 8, the push buttons are arranged in groups with the rectangle 706 including push buttons 1 to 25 inclusive, and rectangle 806 including push buttons numbered 26 to 50, inclusive. Each group of push buttons 706 and 806 has associated therewith a multiple level rotary switch 707 and 807, respectively. The push buttons are divided into groups of 25 with each provided with an associated rotary switch because of the physical limitations of providing a rotary switch with more than 25 points thereon and to reduce the maximum number of steps that a rotary switch will be required to take to pick up the desired sending circuit. The present system is shown and described as including but two groups each of 25 push buttons with their associated rotary switches which provides for a maximum of 50 sending circuits. It will be apparent, however, that the push buttons may be arranged in a single group or in groups of less or more than 25 each, and that additional groups may be added to a system when it is desired to provide for more sending circuits.

Each of the keys in a group, such as 706 and 806, have the upper terminals thereof connected over individual conductors to corresponding points on the fifth or upper levels of associated rotary switches 707 and 807, respectively. In Fig. 7 these connections for keys 1 and 25 only are shown, it being understood that corresponding contacts of the remaining switches are similarly connected. The movable element of each push button is normally in engagement with the upper contact thereof and the movable elements of the push buttons of both groups are connected in multiple to conductor 705 which in the idle condition of the selective switching circuit is grounded through the second righthand tongue and back contact of relay 701. Thus, in the idle condition of the circuit all the points of the upper levels of rotary switches 707 and 807 are grounded.

The lower elements of the push buttons in group 706 are connected in multiple to a circuit extending through the lefthand coil of a relay 708 to potential at the back contact and inner-left-hand tongue of a relay 808. In a similar manner the lower elements of the push buttons in group 806 are connected in multiple to a circuit extending through the left-hand coil of relay 808 to potential at the inner left-hand tongue and back contact of relay 708.

The operation of a push button removes ground from its associated point on the first level of its rotary switch and, if it is assumed that a push button in group 706 is operated. push button No. 1, for example, its operation will remove the ground from the first point of the upper level of rotary switch 707 and complete a circuit through the key for the operation of relay 708. The circuit for the operation of relay 708 is contingent upon relay 808 being in a deenergized condition in the same manner that the operation of relay 808, in response to the actuation of one of the push buttons 26 to 50 of group 806, is contingent upon relay 708 being in a deenergized condition. Thus the relays 708 and 808 are controlled in such a manner that only either one or the other but not both can be operated at a time.

The operation of either one of the relays 708 or 808 completes a circuit for the energization of the step magnet SM of the rotary switch associated with the operated one of the push buttons. If it is assumed that push button No. 1 of group 706 is operated, relay 708 will be energized and through its right-hand tongue completes a circuit from battery through the associated rotary switch step magnet SM, the interrupter contacts 711 thereof, the right-hand tongue and front contact of relay 708, the upper tongue and back contact of relay 703 to the wiper of the upper level of rotary switch 707. Since all the points on the upper level of rotary switch 707 with the exception of the one connected to the actuated push button will at this time be grounded through the contacts of their respective push buttons, the step magnet SM will self-step until the upper wiper finds the ungrounded or No. 1 point, and when the upper wiper reaches this point, further operation of the rotary switch will cease. Relay 703 will thereupon become energized since at this time the shunt circuit to ground around the coil of said relay 703 and the right-hand coil of relay 708 is interrupted. The operating circuit for relay 703 is grounded at the outer right-hand tongue and back contact of relay 701 and although this circuit includes the coil of the step magnet SM of rotary switch 707, the current flow is insufficient to operate said step magnet.

The operation of relay 703 establishes connections through front contacts and tongues thereof, to the wipers of the first, second, third and fourth levels of switch 707 and through its lower tongue interrupts the described circuit to the message waiting lamp 602. If the circuit corresponding to the actuated push button is, at this time, available or idle the corresponding point on the first level of the rotary switch 707 will have ground applied thereto by conductor 714 and since the wiper will at this time be in contact with this point, the grounded circuit will be extended through the wiper, a tongue and front contact of relay 703, conductor 713, the fourth right-hand tongue and back contact of relay 407 and the filament of a standby lamp 415 to potential. The illumination of the standby lamp 415 indicates to the operator that the switching function has been completed.

The operation of relay 703 in extending the circuit from the wiper of the third level of rotary switch 707 completes a circuit from conductor 715 connected to the first point of this level to conductor 718 to the middle tongue of a relay 818. Since relay 818 is at this time deenergized, the said circuit is not extended further. Similarly, conductor 716 connected to the point on which the second wiper of switch 707 is at this time resting, is extended through a front contact and tongue of relay 703, conductor 719, to a tongue of relay 407 that has its associated front contact connected to the normally closed No. 6 contacts of distributor 406. At the same time conductor 717, connected to the corresponding point of the fourth level of switch 707, is extended through the front contact and tongue of relay 703, conductor 721, the coil of relay 818, conductor 819, the back contact and tongue of relay 601 to one of the points on an interrupter 606. The interrupter 606 includes a constantly rotating brush arm 607 which progressively contacts associated points, each one of which is individually associated with selective switching circuits such as that disclosed herein. The circuit to the brush arm 607 extends through normally closed contacts 608 of key 609 and the back contact and tongue of a relay 611 to ground. The conductors 714, 715, 716 and 717 are respectively referred to hereinafter as the lamp circuit, the clutch circuit, the line circuit, and the seize circuit. Conductor 714, as will be described, extends at this time to ground while conductors 715 and 716 are at this time open, and conductor 717 extends to positive potential through a resistance. The other points of the first four levels of rotary switch 707 and those of rotary switch 807 extend in a similar manner to corresponding terminals of associated sending circuits.

If the sending circuit to which the message has been directed is idle at the time relay 703 is operated or when it does become idle, the seize circuit 717 will be conditioned to effect operation of relay 818 when the interrupter wiper 607 contacts the point thereon assigned to calling selective switching circuit. The resistance in this circuit in the arrangement hereinafter described prevents operation of relay 818 if another selective switching circuit is connected to the desired sending circuit and the interrupter 606 is so arranged to permit only one switching circuit to be connected to the desired sending circuit should two or more such switching circuits be waiting for connection thereto. Thus in accordance with the above, relay 818 will only be operated when the desired sending circuit is idle.

The operation of relay 818 completes a circuit for the operation of relay 407 which circuit may be traced from potential through the coil of said relay 407, conductor 417 to ground at the front contact and outer tongue of relay 818. Relay 818 in operating locks up by a circuit from ground through the inner right-hand tongue and back contact of relay 701, to the front contact and inner tongue of relay 818 and the coil thereof to potential over the described circuit. The operation of relay 818 through its center tongue extends the clutch circuit (conductor 715) over conductor 821 to the front contact associated with the tongue of relay 407 in the described circuit to the clutch magnet CM of distributor 406. Since relay 407 will at this time be energized and conductor 715 is at this time open at the sending circuit, the clutch controlled by the magnet CM will not for the time being be released. As relay 407 operated it locked up through its inner right hand tongue and conductor 420 to ground at the front contact and outer left-hand tongue of relay 708.

The completion of the circuit to the clutch magnet CM of the distributor 406 conditions the selective switching circuit to transmit signals representative of the message stored in the storage tape 236. However, transmission of the message does not start immediately since certain other signals are transmitted over the sending circuit ahead of the message. These extra signals include the message number which is transmitted automatically in a manner to be described. For this reason the sending circuit will not be connected at this time to conductor 716 and, therefore, for the time being conductors 715 and 716 will remain open. After the automatic transmission of the message number, conductor 715 is grounded and conductor 716 is extended to the sending circuit selected by the operated push button whereupon the distributor 406 operates to transmit the signals stored in the tape to the sending circuit.

Relay 407 which was operated in the manner described above as the result of operation of relay 818 establishes a circuit for reading the end-of-message signal appended to each message in the tape 236. Relay 407 in operating also interrupts the locking circuit through its inner left-hand tongue to relay 408 whereupon said relay releases. A further function effected by the energization of relay 407 through its fourth right-hand tongue is the extinguishing of the standby lamp 415 and lighting of a connected lamp 419. This advises the operator that the switching circuit has been connected to the sending circuit and that transmission of the message stored in the tape will begin as soon as the automatic message number is transmitted. Relay 421 included in the selective switching circuit is arranged therein in such a manner as to cause the operation of another relay 422 when the first, second, third and fifth pulses of a character are spacing as determined by the position of the pins of the tape transmitter 403. Since the first, second, third and fifth pulses of a carriage return character are spacing, relay 422 will be operated only on a carriage return character or on a blank character. In the case of a blank character the fourth impulse of the character over the pins will be spacing and relay 422 will be released by virtue of a circuit from the No. 4 contact of the distributor transmitter 406 through the opposing or left-hand coil of relay 422.

When a carriage return character is stepped over the pins of the tape transmitter 403, the closure of No. 1 contacts of distributor transmitter 406, on the associated cycle of operation, applies ground through the first tongue and spacing contact of the tape transmitter, the outer left-hand tongue and front contact of relay 407 to potential through the left-hand coil of relay 421. This circuit effects operation of relay 421 and it is held operated during the closure of the No. 2 contacts from distributor 406 by a circuit including the second tongue and spacing contact of the tape transmitter 403 and the inner left-hand tongue and front contact of relay 421. Thus, relay 421 is operated and held operated during the transmission of the first two spacing impulses of a character, and if the third and fifth impulses are also spacing, as will be the case in a carriage return character, relay 421 continues to be held operated by a circuit from ground at the distributor 406 through the No. 3 contacts thereof, the third tongue and spacing contact of transmitter 403, the spacing contact and No. 5 tongue of transmitter 403, the right-hand tongue, front contact and right-hand coil of relay 421, conductor 423, the back contact and outer left-hand tongue of a relay 504, conductor 506, and the right-hand coil of relay 422 to potential which also effects operation of relay 422. Contacts No. 7 on the distributor 406 are arranged to close at the middle of the fourth impulse transmitted therefrom and open at the end of the fifth impulse. During the transmission of a carriage return character, relay 422 will be energized, as described, and the accompanying closure of the No. 7 contacts of distributor 406 completes a circuit from ground thereat over conductor 424, through a tongue and back contact of a relay 507, conductor 508, a tongue and front contact of relay 422, conductor 426, a tongue and back contact of relay 504 and the left-hand coil of a relay 509 to potential. This circuit effects energization of relay 509 and when contacts No. 7 of distributor 406 open, relay 504 is operated by a circuit including the left-hand tongue and front contact of relay 509, the coil of relay 504, conductor 510, the back contact and inner left-hand tongue of relay 701, conductor 710, and the outer right-hand tongue and front contact of relay 407. As relay 504 operates it opens the above-described circuit through the right-hand coil of relay 422 and establishes a circuit through the opposing or left-hand coil thereof whereupon said relay releases. Relay 422 is also released on the receipt of a blank character the fourth pulse of which will be spacing by a circuit including the No. 4 contacts of distributor transmitter 406, the fourth tongue and spacing contact of tape transmitter 403, the second left-hand tongue and front contact of relay 407, the left-hand tongue and front contact of relay 422, the back contact and inner left-hand tongue of relay 504 and the left-hand coil of relay 422.

The release of relay 422 with a blank character in the transmitter 403 occurs before the operation of relay 509 and hence on the transmission of such a character, relays 509 and 504 will not be in an energized condition following the transmission thereof as is the case following the transmission of a carriage return character. Relays 421 and 422 release at the end of transmission of each carriage return character.

Operation of relay 504 in the manner described in response to a carriage return character, through its right-hand tongue prepares a circuit for the energization of relay 501 in response to the next following character if this character is also a carriage return. For this character relay 422 is energized by a circuit through its left-hand coil, and as contacts No. 7 of the distributor close, the circuit through the coil of relay 501 is completed. As relay 501 operates, it conditions a circuit for operating relay 507 when contacts No. 7 of distributor 406 open. This latter circuit includes the inner tongue of relay 501, the right-hand coil of relay 507, a back contact and tongue of relay 701, conductor 710 and a tongue and front contact of relay 407.

Operation of relay 501 also transfers the circuit to the clutch magnet CM of the distributor 406 to ground through a back contact and tongue of relay 507. This insures that the letters character, which with the two carriage return characters forms an end-of-message signal, will be transmitted even though the tape lever contacts 409 may be open at this time and the distributor 406 starts this cycle of operation before relay 507 is operated to remove the ground from this alternate clutch circuit.

As relay 507 operates on the opening of the No. 7 contacts of the distributor 406 during the cycle of operation wherein the second carriage return was transmitted, it establishes a circuit from the ungrounded terminal of the No. 7 contacts through the left-hand coil of relay 507 and the coil of relay 701 to potential. In addition to the above, operation of relay 507 completes a circuit from the grounded outer right-hand tongue thereof through the coil of relay 611 to potential whereupon relay 611 operates. Relay 611 in operating removes the ground from the wiper 607 of the interrupter 606, so that no other selective switching circuit which may be waiting for a connection can get a connection until this particular switching circuit has completed its disconnecting functions.

As contacts No. 7 of distributor 406 close during the transmission of the letters character following the second carriage return, the circuit through the left-hand coil of relay 507 and coil of 701 is completed whereupon relay 701 operates and locks up by a circuit through a front contact of relay 407. The operation of relay 701 interrupts the above-described locking circuit through the coil of relay 818 and also the circuit to the step magnet SM of the tape transmitter 403. When contact No. 7 opens at the end of the fifth impulse of this same letters character, the circuit through the left-hand coil of relay 507 is interrupted whereupon said relay releases and it in turn removes ground from the holding circuit through the coils of relays 703 and 708 whereupon these relays also release. A further function effected upon the release of relay 507 is the release of relay 611 which reestablishes the connection between ground and the wiper 607 of the interrupter. When relay 708 releases it opens the locking circuit to relay 407 which also releases and in doing so removes ground from the locking circuit of relay 701. At the end of the step pulse from the No. 8 contact of distributor transmitter 406, relay 701 will release. Now all the relays of the selective switching circuit are in their original position and the circuit in the manner set forth is in readiness to idle through the transmitter 403 any letters character appearing in the tape 236 as long as the tape lever contacts 409 remain closed.

The relay which was operated, in the manner to be described, and was locked up in series with relay 818, releases with relay 818 and transfers the line circuit from the selective switching circuit back to its idle circuit condition.

It sometimes happens that certain messages are received at a switching center which should have immediate attention. These messages are preceded by a bell signal and effect the closing of so-called bell contacts on the printer-perforator preparing the tape. A set of such contacts has been shown at 612 in Fig. 6 within the rectangle 613 and while such contacts would actually be included within a printer-perforator such as 204, they have been shown in this manner for simplicity of the drawings. Reception of the bell signal character by the printer perforator closes the normally open contact 612 to complete a circuit through the coil of relay 603 whereupon said relay is energized and locked up. Energization of relay 603 completes a circuit from battery through the filament of the message waiting lamp 602, a tongue and front contact of relay 603, the coil of the relay 614, contacts 616 of the interrupter 606 to ground. Contacts 616 are periodically closed by the interrupter and therefore the above circuit is periodically completed to cause flashing of the message waiting lamp 602 and intermittent operation of a common audible signaling device such as a bell 617 controlled from the front contact and tongue of relay 614. The audible signaling device 617 calls attention to the operator that a message requiring special handling is being received and the flashing message waiting lamp 602 indicates the particular selective switching circuit receiving such a message. A normally closed reset key 618 permits opening of the circuit to relay 603 to interrupt the circuit producing the periodic operation of the message waiting lamp 602 and signaling device 617.

The normally closed message waiting reset key 411 may be opened to release relay 408 which normally effects the illumination of the message waiting lamp 602 when it is desired to pull through the transmitter 403 any intelligence not to be switched. Also a disconnect key 512 is provided to effect energization of the relay 701 to release the switching circuit in the event of misswitch or an improper message termination.

*Sending circuit and numbering machine distributor circuit*

The so-called sending circuit includes the control equipment and relays for connecting a sending circuit or line to a selective switching circuit when a push button therein is operated. The sending circuit also includes auxiliary circuits and controls to permit a sending circuit to be connected only when idle and to prevent the connection of more than one switching circuit thereto at a time. A numbering machine is included in each sending circuit and is arranged to consecutively number each message transmitted over the sending circuit and to automatically send these numbers and other service signals ahead of their respective messages. A sending circuit is provided for each outgoing or sending line which terminates at a switching center.

A numbering machine distributor circuit includes a distributor for operating the numbering machines of the sending circuits and at least one such distributor circuit is included at a switching center. A distributor circuit is associated with a sending circuit and numbering machine through rotary switches which operate to connect the distributor thereto when a sending circuit is selected. Also included in each distributor circuit is a recording mechanism, such as a teleprinter, which copies each automatic number and the first line of each message transmitted over the sending circuits with which the distributor circuit may be associated. As the distributor circuit is operated only during the transmission of the automatic message number and the first line of the associated message, it is released from the sending circuit at the end of the first line and may be associated with other lines during the transmission of the remainder of the message.

A sending circuit is associated with each set of points on the rotary switches 707 and 807 and connected thereto by means of conductors such as 714 to 717. It will be assumed in the following description of the sending circuit and numbering machine distributor circuit shown in Figs. 9 to 12 that it is connected to the first points on rotary switch 707 by means of the conductors 714 to 717.

Figure 9:
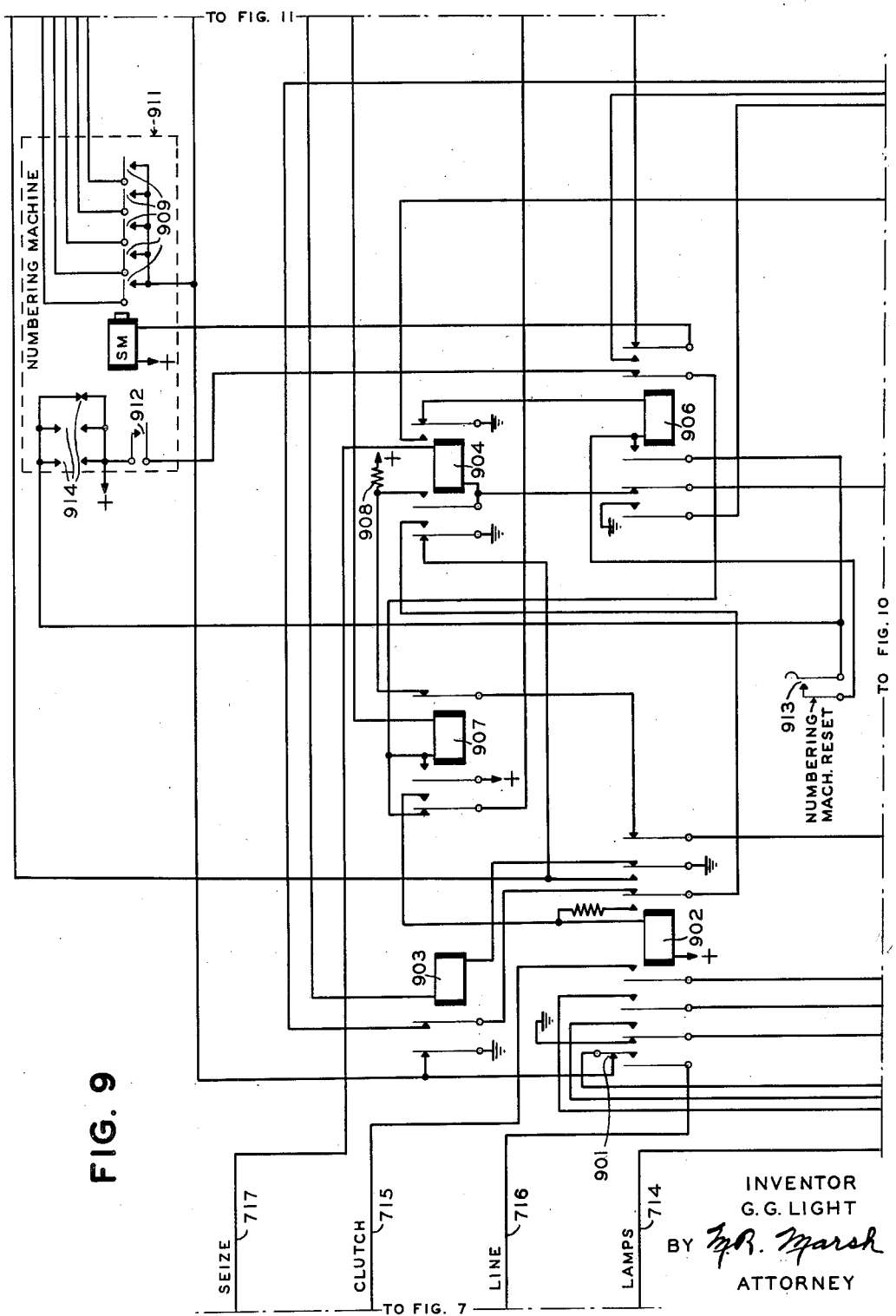
Figs. 9 and 10 are circuit diagrams of a sending circuit.
Figure 10:
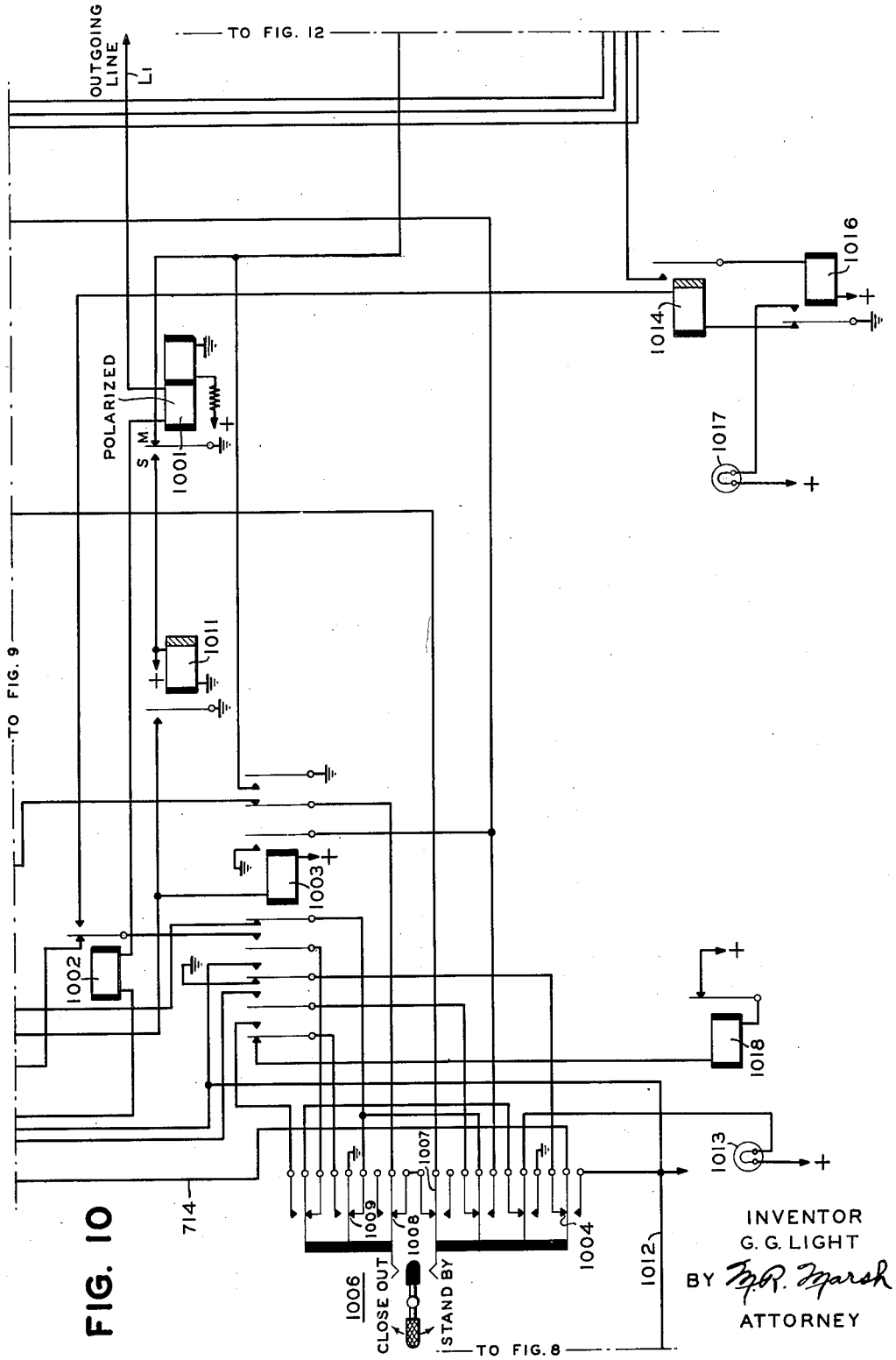

As shown in Figs. 9 and 10, the outgoing line or sending circuit L1 is connected through the coils of a biased polar relay 1001 and a neutral relay 1002, and contacts 901 of a relay 902, to ground through a back contact and tongue of a relay 903. The line circuit L1 normally has marking potential applied thereto at the distant end and accordingly relays 1001 and 1002 will be energized in the idle condition of the line.

As described above, the operation of the push button effects the application of potential through the standby lamp 415 to conductor 714, and ground for this circuit is obtained from a back contact and tongue of a relay 1003 through normally closed contacts 1004 of a standby and close out switch 1006. The transmitting circuit from the selective switching circuit extends by means of conductor 716 to the tongue of relay 902 associated with contacts 901.

When the selected line is idle and ground is applied as described by the interrupter 606, through the coil of relay 818, Fig. 8, to conductor 717, this circuit is completed at the sending circuit, Figs. 9 and 10, through the coil of a relay 904, the back contact and tongue of a relay 906, closed contacts 1007 and 1008 of switch 1006, tongues and back contacts of relays 1003, 902 and 907, through a resistance 908 to positive potential. Relays 818 and 904 thereupon operate and lock up to ground through the inner left-hand tongue and front contact of relay 818, thus lowering the potential on conductor 717 to such a value as to prevent the sending circuit from being seized by relay 818 of any other selective switching circuit.

As relay 904 operates, the outer left-hand tongue thereof removes the ground normally applied to an associated point on the upper or eighth level of rotary switch 1101 and applies this ground through a front contact of relay 904, tongues and back contacts of relays 902, 903 and 1201, a resistance 1202, normally closed contacts of a manually operable switch 1203, a tongue and back contact of a relay 1204 and through the left-hand coil of a relay 1102 to potential. This circuit effects energization of relay 1102 which locks up through its inner left-hand tongue, a back contact and tongue of relay 1204, and the coil of relay 1201 to ground over a part of the above circuit.

The operation of relay 1102 completes a circuit from the wiper of the eighth level of rotary switch 1101 through a tongue and back contact of a relay 1103, a front contact and tongue of relay 1102, through the coil of the step magnet SM of rotary switch 1101 to potential. All the points on the eighth level of rotary switch 1101 except the one representing the selected sending circuit or the operated push button are grounded and hence completion of the above circuit effects operation of the step magnet SM. The step magnet of rotary switch 1101 will thereupon self-step until the wiper of the eighth level reaches the ungrounded point or the one assigned to the selected sending circuit, and the other wipers of the switch will come to rest on corresponding points of their respective levels. When the eighth wiper of rotary switch 1101 reaches the ungrounded point, the short-circuiting ground around the coil of relay 1103 will be interrupted, whereupon said relay operates and the resistance of the coil thereof limits the current flow therethrough to such a value as to prevent further operation of the step magnet MS. In this position of the switch 1101 the wiper of the seventh level completes a circuit therethrough from a front contact of relay 1104 to the back contact of relay 903 at which the line circuit L1 is at this time grounded while the second to the sixth wipers of the switch connect one terminal of contacts 909 of the sending circuit numbering machine 911 to one terminal of respective contacts numbered 1 to 5 of distributor 1106. Both of these groups of contacts are open in the idle condition of the numbering machine 911 and the distributor 1106.

The wiper of the first level of switch 1101 is grounded and the points thereof are connected individually to respective points on the sixth level of rotary switch 1206 and therefore a point on the sixth level of switch 1206 corresponding to the position of the wipers of switch 1101 will have ground connected thereto.

The operation of relay 1103 completes a circuit from battery through the coil of relay 1104, a tongue and back contact of a relay 1107, a front contact and tongue of relay 1103, the coil of a relay 1207, and the interrupter contacts of the step magnet SM of rotary switch 1206 to ground. Relay 1104 is a high current relay and does not operate by the above circuit but relay 1207 does. Relay 1207 in operating completes a circuit to the step magnet SM of switch 1206 which operates to interrupt the circuit to relay 1207 and during the release of the step magnet, the wipers of switch 1206 are advanced one step. The above energization and deenergization of relay 1207 and the step magnet SM of switch 1206 continue until the wiper of the sixth level reaches the grounded point and it thereupon short-circuits the coil of relay 1207 and permits an increase in current through the coil of relay 1104 sufficient to cause energization thereof. Relay 1104 in operating locks up through a circuit independent of contacts of relay 1107.

Operation of relay 1104 through its left-hand tongue and front contact extends a ground through normally closed No. 6 contacts of distributor 1106 over the above-described circuit to the back contact of the outer tongue of relay 903 so that when relay 903 is subsequently operated, in a manner to be described, the line circuit L1 is grounded at the distributor 1106. A further function of relay 1104 in operating is the removal of the ground normally applied through contacts 1108 to the selecting magnet 1210 of the monitor printer 1209 and the extension of this circuit from the printer through the wiper of the second level of switch 1206 to ground through the marking contact of polar relay 1101.

A still further function of relay 1104 in operating is the grounding of the point on the eighth level of rotary switch 1101 at which the wipers thereof are at this time stopped so that a second numbering machine distributor circuit will pass over this point when searching, if more than one such distributor circuit is employed at the switching center. The above circuit includes a front contact and tongue of relay 1103 and the wiper of the eighth level switch 1101.

Relay 1104 in operating also completes a circuit from ground through the second right-hand tongue and back contact of relay 902, the coil of a relay 903, the fourth level and wiper of switch 1206, the coil of a relay 1208, a tongue and back contact of relay 1107, a front contact and tongue of relay 1104 and normally closed contacts of switch 1203 to potential. The above circuit effects energization of relays 903 and 1208 and the former in operating extends the line circuit to the distributor 1106. Relay 1208 in operating completes a circuit from ground at the outer right-hand tongue thereof through the coils of relays 1107 and 1204 to potential whereupon said relays operate. In addition to the above, the operation of relay 1208 completes a circuit from ground at the second right-hand tongue thereof to potential through the clutch magnet CM of the distributor 1106 whereupon the distributor is released for operation.

As distributor 1106 operates, the No. 6 contact opens to transmit a no-current start impulse to the line circuit L1 and then contacts 1 to 5 sequentially close to apply ground to contacts 909 of the numbering machine 911. Depending upon the position of the contacts 909 at this time, impulses of current and no-current or closed and open line conditions are transmitted to the line. The closing of the No. 8 contacts of the distributor completes a circuit through a front contact and tongue of relay 1208, the wiper of the first level of switch 1206, a back contact and tongue of relay 906 and the step magnet SM of the numbering machine 911 to potential. This circuit effects energization of the step magnet SM whereupon the contacts 909 are reset in accordance with the next character to be transmitted from the numbering machine during the next cycle of operation of the distributor 1106. These cycles of operation of the numbering machine 911 and distributor 1106 continue until the numbering machine has caused to be transmitted to the line a predetermined number of signal groups, and incident to the last cycle of operation thereof contacts 912 of the numbering machine close. Closure of these contacts establishes a circuit from battery thereat through a tongue and back contact of relay 906, the coil of relay 907, a point on the fifth level and wiper of switch 1206, to ground at the front contact and tongue of relay 1107. The above circuit, however, does not cause energization of relay 907 since the coil thereof is shunted by a circuit extending through a back contact and tongue of relay 907, a point on the third level and wiper of rotary switch 1206 to ground, through contacts No. 9 of distributor 1106 which will be closed at this time. When contacts No. 9 of the distributor open, relay 907 operates and locks up, and in operating prepares a circuit for the operation of relay 902 on the next closure of contacts No. 9.

When relay 902 operates on the closure of contacts No. 9 of the distributor during the following cycle of operation thereof, it locks up to ground through a front contact of relay 904. The operation of relay 902 through its contacts 901 and the associated tongue, connects the line circuit L1 which heretofore extended to the numbering machine 911, to conductor 716 leading to the selective switching circuit. Relay 902 in operating also opens the locking circuit to relays 903 and 1208 and completes a circuit from ground through closed contacts 1009 of switch 1006, a tongue and back contact of relay 1103, a tongue and front contact of relay 902, to conductor 715 extending as described above, to the clutch magnet CM of the distributor 406 associated with the tape transmitter 403. A still further function performed by relay 902 is the conditioning of a locking circuit for relay 1003 which will be effective to lock said relay in an energized condition should it be operated during the transmission of a message. Relay 1003 might be operated as a result of an open-line condition which would permit polar relay 1001 to remain spacing for a sufficient length of time to effect release of slow-to-release relay 1011, and complete a circuit for operation of relay 1003.

The closure of the circuit to the clutch magnet CM of distributor 406 initiates the said distributor into operation whereby the message stored in the perforated tape 236 will be transmitted to the line L1. At this time, the printer 1209 is still connected to the marking contact of relay 1001 and the printer, which at this time will have recorded the automatic number transmitted from the number machine 911, will begin to record the message signals transmitted.

The printer 1209 has included therein a plurality of normally open contacts identified as LF, CR and common. The LF contacts close on the receipt of a line feed signal, the CR contacts close on receipt of a carriage return signal and the common contacts close during each cycle of operation of the printer. At the end of each line of print in the message, a carriage return and line feeding signal are transmitted to condition the recording printer at the distant end of the outgoing line for the commencement of a new line of print and in the embodiment of the invention herein disclosed these signals are employed to disconnect the monitor printer 1209 from the sending circuit. Accordingly, the printer 1209 copies only the automatic message number preceding each message and the first line thereof. When the printer 1209 is disconnected from a sending circuit at the end of the first line of the message it is available for connection to another line even though the transmission of the first message may at this time be in progress.

The closure of the CR contacts on the printer 1209 at the end of the first line printed completes a circuit from ground through a tongue and back contact of relay 1211, the coil of relay 1212 and a tongue and back contact of a relay 1213 to potential. Relay 1212 thereupon operates and completes a circuit from the front contact thereof through the left-hand coil of relay 1211 to ground. The circuit through the left-hand coil of relay 1211, however, is at this time shunted by the CR and the common contacts of printer 1209 which close concomitantly with contacts CR and relay 1211 does not operate until these contacts open. Relay 1211 in operating prepares a circuit from the ungrounded terminal of the LF contact through the coil of a relay 1109 to potential so that if the next character is a line feed character, the closure of the LF contacts will effect energization of relay 1109. If the next character following the carriage return character is some other than a line feed character, the closure of the common contacts during this cycle of operation of the printer 1209 will effect energization of relay 1213 which in operating opens the locking circuit through relay 1212 and 1211 whereupon they will return to their normal unoperated position as the common contacts open.

The operation of relay 1109 in response to a carriage return followed by a line feed character, opens the locking circuit through the right-hand coil of relay 1102 whereupon said relay releases and it in turn opens the locking circuit through the coil of relay 1103. Relay 1103 in releasing opens the locking circuit through the coil of relay 1104 which in releasing opens the locking circuit extending through the coils of relay 1107 and 1204. Relay 1104 in releasing disconnects the selecting magnet 1210 of the teleprinter 1209 from the marking contact of the polar relay 1091 in the sending circuit Ll and through contacts 1108 applies a holding ground thereto.

Relay 1208 in releasing which had its locking circuit interrupted when relay 902 operated, opens the circuit to the clutch magnet CM of the distributor 1106 whereupon further operation thereof ceases. All the relays of the numbering machine distributor circuit are now in their deenergized or idle circuit condition in readiness to respond to the request of another sending circuit for a distributor.

If relay 1109 is not operated in response to the receipt of a carriage return and line feed character by the printer 1209 within a predetermined length of time, as for example within 10 seconds, which is longer than the time required for the printer to copy the automatic message number and the first line of the associated message, the attendant or operator is notified of this condition by means of the operation of an audible signaling device such as a bell 1214 and the lighting of a lamp 1216. The lamp and bell are shown included in the printer 1209 and their operation may be caused either by faulty transmission or by failure of the printer to copy correctly the signals transmitted over the sending circuit. When these signaling devices are operated the attendant may observe the printed record on the storage tape 236 controlling the tape transmitter 493 of the connected selective switching circuit and, by means of the keyboard included in the printer, type in the missing information together with the carriage return and line feed characters. These last two characters will effect disconnecting of the printer from the sending circuit in the manner described.

In accordance with the above it is obvious that the monitor printers, such as 1209, automatically prepare a readily available record of each switching operation performed at the switching center to enable a lost or mutilated message to be more readily traced than in systems heretofore proposed. All messages transmitted over a sending circuit from a switching center are consecutively numbered for each particular sending circuit and in the event of non-receipt of a particular message at the destination, the interruption of the number sequence will apprise the operator thereat that one or more messages have been lost. In such an event the operator at a receiving point informs the switching center that a message which should bear a certain number has not been received whereupon the operator at the switching center inspecting the record made by the monitor printers can readily determine over which receiving circuit the lost message was received and the number assigned to this message when it was transmitted from a remote sending point. With this information available the attendant at the switching center can readily locate the lost message in the perforated tape and cause the same to be retransmitted to the proper sending circuit. The recording of the number under which the message is transmitted from a switching center in association with the number under which the message was received, together with the originating point and destination of the message which is included in the first line thereof and which is recorded by the monitor printer, is fully automatic and the normal operation thereof requires no effort on the part of the attendant at the switching center. This arrangement eliminates a considerable portion of the attendants' duties necessary in prior art switching systems, and furthermore eliminates possible chances of error of the prior art systems where all or part of such a record was made manually by the attendant.

The timing unit which initiates operation of the signaling devices 1214 and 1216 after the expiration of the predetermined time following a connection of a distributor circuit to the sending circuit is effected by means of a cold cathode tube 1111 which has in the grid circuit thereof a resistance and condenser network 1112. If relay 1109 is not operated to release relay 1102 within the prescribed time, vacuum tube 1111 will pass current and effect energization of relay 1113 and when relay 1113 operates a circuit to the signaling units 1214 and 1216 is completed.

Should the sending circuit L1 go open during the transmission of a message, this condition is called to the attention of the operator. Such an open line condition if of longer duration than that occurring during the normal transmission of a message would permit relay 1011 to release which in turn would effect operation of relay 1003. Operation of relay 1003 completes a connection between conductors 714 and 1012. Conductor 714 at this time extends to the connected lamp 419 and conductor 1012 to the interrupter contacts 616 of the interrupter 606. The connected lamp 419 will thereupon flash to apprise the operator of the open line condition. Operation of relay 1003 also removes ground from conductor 715 to release the clutch magnet CM of the distributor transmitter 406 to stop further operation of this distributor. Furthermore, the operation of relay 1003 completes a circuit from potential through the filament of a close-out lamp 1013, closed contacts of switch 1006, a tongue and front contact of relay 1003, the tongue and back contact of relay 1002 which will at this time be deenergized, the coil of a relay 1014 to ground at the back contact and tongue of a relay 1016. This circuit effects illumination of the close-out lamp 1013 and energization of slow-to-release relay 1014 which in operating completes a circuit for the operation of relay 1016 each time the constantly operating No. 7 contacts of distributor 1106 close. Each time relay 1016 is energized and deenergized, the close-out lamp 1013 will flash as will another lamp 1017 located at a control position the circuit to which is completed each time relay 1016 operates.

If the operation of relay 1003 is caused by reversal of potential at the distant end of the sending circuit L1, relay 1002 will be energized and in this event the circuit to the close-out lamp 1013 will be from contacts 616 of the interrupter 606, whereas if the line goes open, the circuit to this lamp, as described, is from a back contact of relay 1016 operated by contact No. 7 of distributor 1106. The contacts 616 on the interrupter operate at a different rate than do contacts No. 7 of the distributor 1106, and, hence, the close-out lamp 1013 will be flashed at a different rate in the event non-transmission of the message is due to a reversal of potential on the sending circuit than it will if the non-transmission is due to an open sending circuit.

Flashing of the connected lamp at the selected switching circuit indicates to the operator that transmission of a message has stopped and the attendant may observe the close-out lamp 1017 or 1013 to determine by the rate of flash thereof whether the non-transmission is due to an open or the reversal of potential on the sending circuit.

In the event of such sending circuit failures, the attendant may by means of the close-out switch 1006, close out the sending circuit by operating the close-out switch to its close-out position or by operating the switch to a standby position to temporarily halt transmission thereto until the line circuit has been restored to normal. Operating the switch 1006 to its close-out position or the position thereof wherein the lower tongues are actuated from their normal positions, opens the circuit through the contacts 1007 thereof. These contacts as described are included in the circuit which initiated the operation of relay 904 and, hence, with these contacts open this relay cannot be operated to initiate seizing of the associated outgoing line. Such operation of the switch 1006 also opens the locking circuit to relay 1003 and completes an obvious circuit to the close-out lamp 1013. Lamp 1013 is thereupon steadily illuminated and an interrupted ground circuit from contacts 616 of the interrupter 606 is completed to conductor 714, whereupon the connected lamp, such as 419, of the connected selective switching circuit and the standby lamp or lamps, such as 415 of other selective switching circuits that may be waiting for connection for this particular sending circuit are flashed.

The lamps 415, 519 and 1013 operating in such a manner indicate to the operators and attendants that this particular sending circuit is closed out and messages destined for transmission over this circuit should be rerouted in accordance with the prescribed arrangement.

The operation of the close-out switch to its standby position where the upper tongues are moved out of their normal position, lights the close-out lamp 1013 steadily, opens the locking circuit of relay 1003, opens contacts 1008 included in the operating circuit of relay 904 and prepares a circuit for the operation of an audible signaling device 1018 such as a buzzer. With the switch in this standby position, the tape 236 may be manually set back in the transmitter 403 for subsequent retransmission of a part or the entire message. The subsequent retransmission of the message will be effected without the operation of the numbering machine 911 through another cycle of operation and hence the message is transmitted under the same automatic number. The restoration of the line circuit L1 to normal will effect opening of the circuit through relay 1003 whereupon it will release and through a tongue and back contact thereof complete the circuit to the audible signaling device 1018. The operation of this audible signal 1018 indicates to the operator that the circuit has been restored and that the switch 1006 may now be returned to its normal position. When the switch is returned to its normal or mid-position, the selective switching circuit will function to retransmit the message or the desired part thereof.

The transmission of an end-of-message signal at the end of a message from the transmitter 403 effects, in the manner described, the release of relay 818 of the selective switching circuit and since the coil of relay 904 of the connected sending circuit is in series therewith, relay 904 will also release. As relay 904 releases it opens the locking circuit to relay 902 whereupon this relay releases. Relay 902 releasing at this time places idle-condition ground from a back contact and tongue of relay 903 through contacts 901 back on the sending circuit L1.

Circuits are provided to reset the numbering machine 911 to an original position so as to begin a new number series and this is effected by the operation of the numbering machine reset key 913. With relay 904 deenergized, the operation of reset key 913 completes a circuit from ground through the coil of relay 906, key 913 and contacts 914 of the numbering machine to potential. At least one of the contacts 914 will be closed when the numbering machine 911 is in any other but its normal or zero position and as relay 906 operates, it is locked up through one or more of these contacts 914. Operation of relay 906 completes a circuit from the step magnet SM of the numbering machine 911 through a tongue and front contact of relay 906 to a tongue of relay 1217, the front contacts of which are grounded. Operation of relay 906 also opens the circuit by means of which relay 904 may be operated to prevent seizing of the outgoing line during the resetting of the numbering machine to zero and completes a circuit for operation of relay 1218. Relay 1218 in operating extends the circuit from the No. 7 contacts of distributor 1106 through the coil of relay 1217 whereupon relay 1217 is operated each time these constantly operating contacts close. Each time relay 1217 operates the above-described circuit to the step magnet SM of the numbering machine 911 is completed to advance the same one step. These pulses to the step magnet continue until the numbering machine reaches its zero position at which time the reset contacts 914 will open to release relay 906 which in turn opens the said step magnet circuit and the circuit to relay 1218.

Figure 11:
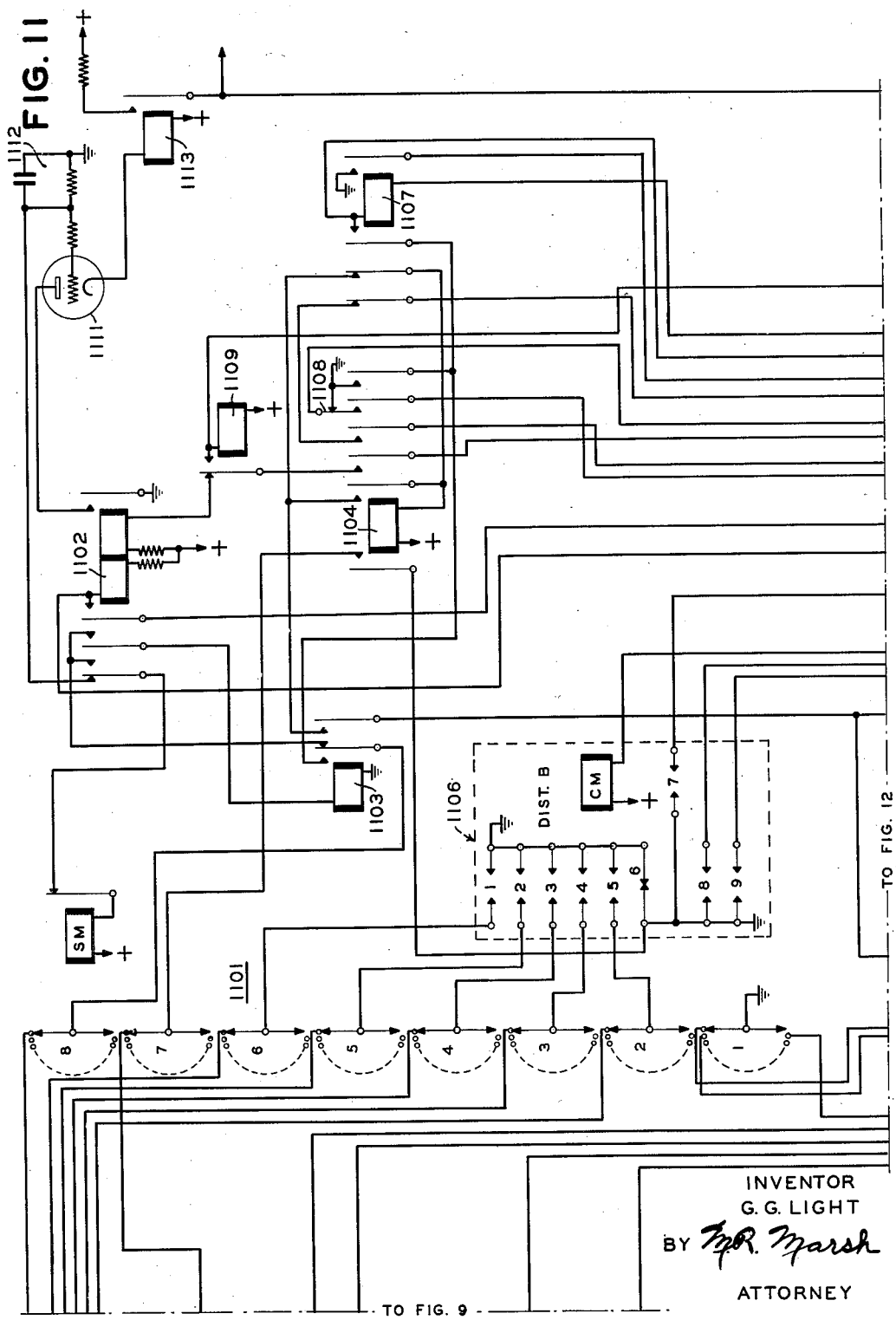
Figs. 11 and 12 are circuit diagrams of a numbering machine distributor circuit.
Figure 12:
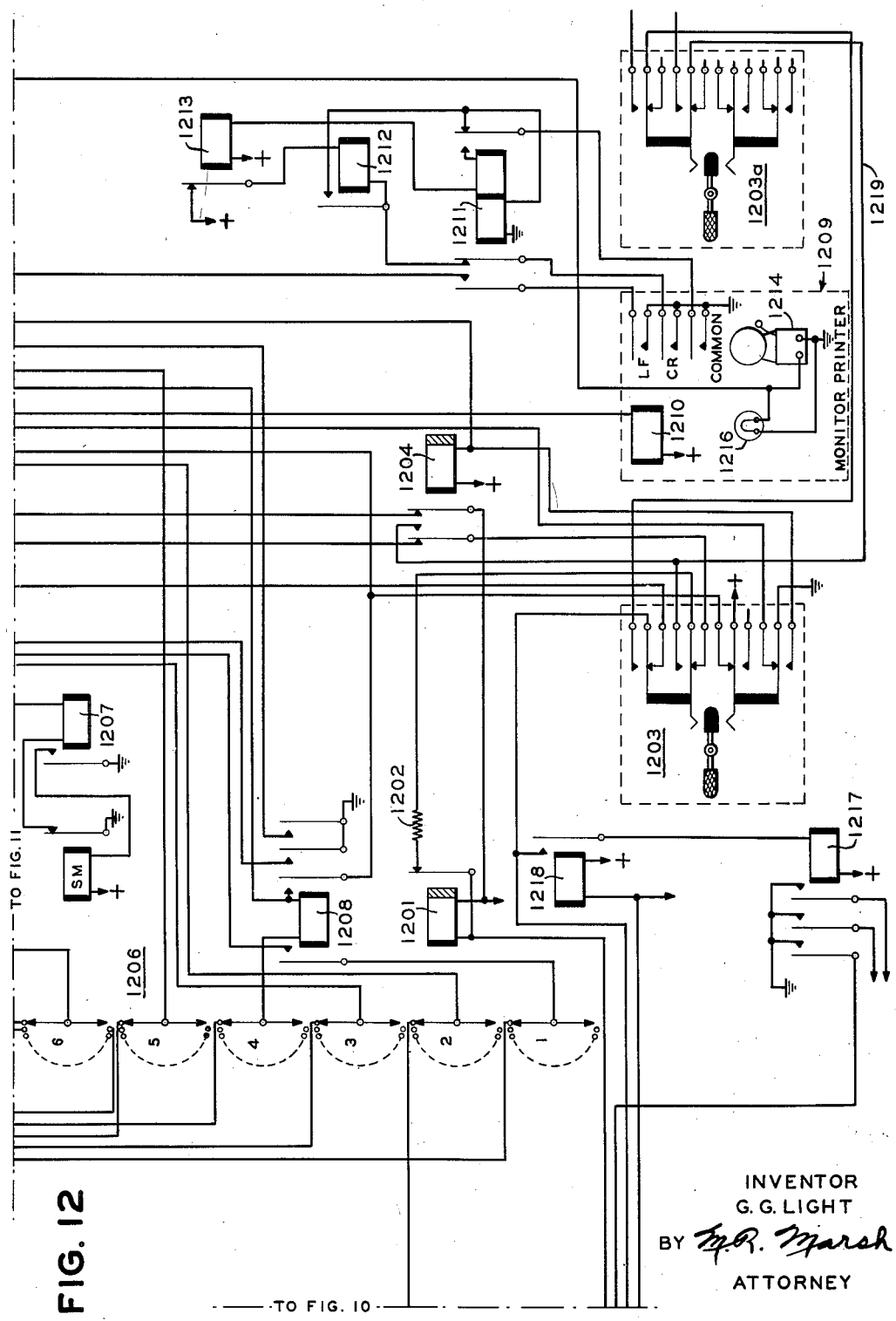

As mentioned above, the numbering machine distributor circuits are arranged in a concentrator plan and by this arrangement not as many of these distributor circuits are required as there are sending circuits and, therefore, more economical use of the equipment is obtained. Accordingly, if a numbering machine distributor circuit, such as the one disclosed in Figs. 11 and 12, is busy and associated with a sending circuit when another sending circuit calls for a distributor, the next numbering machine distributor will be chosen and function in the manner described. However, the first numbering machine distributor circuit will be chosen whenever it is idle. When a numbering machine distributor circuit is busy, its relay such as 1204 is energized and the energization thereof extends the circuit normally passing through the outer tongue and back contact of such a relay 1204, through the front contact thereof to a conductor 1219 connected in parallel to the keys such as 1203 of all the numbering machine distributor circuits. Hence, the lowest numbered idle numbering machine distributor circuit will be chosen when a sending circuit makes a call for such a distributor. A numbering machine distributor circuit may also be busied by operation of its key 1233 to actuate the upper tongues thereof which has the same effect in this respect on the circuit as the operation of its associated relay 1304. A distributor circuit may be released by the operation of its key 1203 to such a position as to actuate the lower tongues thereof.

While the invention has been described in but a single embodiment thereof it will be apparent that various modifications thereof may be made without departing from the scope or essential attributes thereof, and it is desired, therefore, that only such limitations be placed thereon as are imposed in the appended claims.

What is claimed is:

1. In a telegraph switching system, a receiving channel over which message groups of signals are received, a message character storage device responsive to received signals and a transmitting device associated with said channel for storing and repeating signals received over said channel, a plurality of outgoing telegraph channels each connectable to a different point on a bank of a rotary switch, a plurality of manually operable selecting elements one for each outgoing channel, means controlled by the operation of any one of said selecting elements to operate said rotary switch to a point represented by the actuated element, said element thereupon being releasable, and means operative by said rotary switch on reaching such a point to initiate the establishment of a transmission path from the transmitting device through said switch to the outgoing channel represented by the operated selecting element.

2. In a telegraph system, a message switching office, an incoming telegraph channel over which message groups of telegraph signals are received, a signal storage device associated therewith for storing received signals, a transmitter for repeating the stored signals, a plurality of outgoing telegraph channels, a manually operable element for each of said outgoing channels, said elements having normal and operative positions, a switching mechanism, means including said elements in operative positions for controlling said switching mechanism to connect said transmitter to desired outgoing channels one at a time, said elements being returnable to normal position following such operation of said switching mechanism.

3. In a telegraph system, a message switching office, an incoming telegraph channel over which message groups of telegraph signals are received, a signal storage device associated therewith for storing received signals, a transmitter for repeating the stored signals, a plurality of outgoing telegraph channels, a self-restoring manually operable element for each of said outgoing channels, a switching mechanism, and means operative during the actuation of any one of said elements for controlling said switching mechanism to establish a signal transmitting circuit between said transmitter and an outgoing channel represented by an actuated one of said elements, said established circuit thereupon being independent of the actuated or non-actuated condition of said element.

4. In a telegraph exchange system comprising a central office, a plurality of outgoing telegraph circuits, a telegraph transmitting mechanism for transmitting stored message groups of signals, circuit seizing means, a plurality of self-restoring manually operable elements for selecting an outgoing circuit and during operation of any one thereof to control said seizing means to seize the same, if in an idle condition, means operative if a selected circuit is busy to condition said seizing means to seize the selected circuit when it becomes idle, and means to transmit stored message signals to the seized circuit.

5. In a telegraph exchange system comprising a central office, a plurality of outgoing telegraph circuits, a telegraph transmitting mechanism for transmitting stored message groups of permutation type signals, a plurality of manually operable elements for selecting outgoing circuits, one at a time, circuit seizing means, means operative on the selection of a circuit by actuation of one of said elements and during such actuation to initiate operation of said seizing means to seize the selected circuit if idle and means to connect said transmitting mechanism to the seized circuit.

6. In a telegraph system, a storage medium, means for storing message groups of code signals in said medium with each group separated by end-of-message code signals, a transmitter for transmitting said stored signals, a plurality of outgoing telegraph channels, a switching mechanism for connecting said transmitter to said outgoing channels one at a time, a plurality of manually operable elements, means effective during operation of any one of said elements for controlling said switching mechanism to seize the outgoing channel corresponding to an operated element and connect said transmitter thereto for transmission of a stored message, said operated element being releasable following such seizing operation, and means controlled by the transmission of the accompanying end-of-message code signals by said transmitter to release the seized out-going channel after the transmission of the message.

7. In a telegraph system, a storage medium, means for storing message groups of code signals in said medium with each group separated by end-of-message code signals, a permutation signal transmitter for transmitting said stored signals, a plurality of rotary switches, a group of outgoing channels associated with each of said switches, said switches being operative to connect said transmitter to said channels, a plurality of groups of manually operable elements, each group being associated with a respective one of said switches for controlling the operation thereof, and means for preventing operation of more than one of said rotary switches at a time.

8. In a telegraph system, a storage medium, means for storing message groups of code signals in said medium with each group separated by end-of-message code signals, a permutation signal transmitter for transmitting said stored signals, a plurality of outgoing telegraph channels, a switching mechanism for connecting said transmitter to said outgoing channels one at a time, a plurality of manually operable elements for controlling said switching mechanism to seize an outgoing channel corresponding to an operated element and connect said transmitter thereto for transmission of a stored message, means controlled by the accompanying end-of-message code signals to release the seized outgoing channel after the transmission of the message, and automatic means to prevent the seizure of a second outgoing channel in response to the operation of another manually operable element until the release of the first seized channel.

9. In a telegraph system, a permutation code signal transmitter, an associated selective switching circuit for establishing a signal transmitting channel between said transmitter selectively and any one of a plurality of outgoing channels at a time, means including manually operable elements one for each outgoing channel to select a channel and control said switching circuit to establish a transmitting circuit thereto, means to partially establish said transmitting circuit when the selected outgoing channel is busy at the time of operating an element and to automatically complete the establishment thereof when the selected channel becomes idle, said element being releasable following the partial establishment of said circuit, a plurality of indicating means and means including said indicating means to indicate the partial and the complete establishment of a transmitting circuit.

10. In a telegraph system, a permutation code signal transmitter, an associated selective switching circuit for establishing a signal transmitting path between said transmitter selectively and any one of a plurality of outgoing channels at a time, means including manually operable elements one for each outgoing channel to select a channel and control said switching circuit to establish a transmitting path thereto, means to partially establish said transmitting path when the selected outgoing channel is busy at the time of operating an element and to automatically complete the establishment thereof when the selected channel becomes idle, said element being releasable following the partial establishment of said circuit.

11. In a telegraph system, a permutation code signal transmitter, an associated selective switching circuit for establishing a signal transmitting circuit between said transmitter selectively and any one of a plurality of outgoing channels at a time, means including manually operable elements one for each outgoing channel to select a channel and control said switching circuit to establish a transmitting circuit thereto, means to partially establish said transmitting circuit when the selected outgoing channel is busy at the time of operating an element and to automatically complete the establishment thereof when the selected channel becomes idle, said element being releasable following the partial establishment of said circuit, and means to prevent the establishment of another partial or complete transmitting circuit by said selective switching circuit while said transmitter is transmitting to a selected channel.

12. In a telegraph system, a permutation code signal transmitter, an associated selective switching circuit for establishing a signal transmitting circuit between said transmitter selectively and any one of a plurality of outgoing channels at a time, means including manually operable elements one for each outgoing channel to select a channel and control said switching circuit to establish a transmitting circuit thereto, means to partially establish said transmitting circuit when the selected outgoing channel is busy at the time of operating an element and to automatically complete the establishment thereof when the selected channel becomes idle, said element being releasable following the partial establishment of said circuit, and means to prevent the establishment of another partial or complete transmitting circuit by said selective switching circuit while said transmitter is waiting for a selected channel to become idle.

13. In a telegraph system, a code signal transmitter, an associated selective switching circuit for establishing a signal transmitting circuit between said transmitter selectively and any one of a plurality of outgoing channels at a time, means including manually operable elements one for each outgoing channel to select a channel and control said switching circuit to establish a transmitting circuit thereto, means for establishing said transmitting circuit within a predetermined period of time after the operation of an element if the selected outgoing channel is idle, means for automatically establishing said circuit when the selected channel becomes idle if it is busy at the time of operating an element, said element being required to be operated in either case for a period not greater than said predetermined period, and means controlled by predetermined signals transmitted by said transmitter for interrupting an established transmitting circuit and rendering said switching circuit available for the establishment of another transmitting circuit from said transmitter.

14. In a telegraph system, a code signal transmitter, an associated selective switching circuit for establishing a signal transmitting circuit between said transmitter selectively and any one of a plurality of outgoing channels at a time, means including manually operable elements one for each outgoing channel to select a channel and control said switching circuit to establish a transmitting circuit thereto, means to partially establish said transmitting circuit when the selected outgoing channel is busy at the time of operating an element and to automatically complete the establishment thereof when the selected channel becomes idle, a manually operable disconnecting element independent of said other manually operable elements and means including said last mentioned element for interrupting a partially or completely established transmitting circuit between said transmitter and a selected outgoing channel and render said switching circuit available to establish other transmitting circuits.

15. In a telegraph switching system, a plurality of signal transmitters adapted to transmit message groups of signals stored in associated control mediums wherein each message group of signals is separated by an end-of-message signal, a plurality of outgoing signal transmitting channels, switching means for establishing signal transmission paths between each of said transmitters and any one of said channels, a plurality of self-restoring manually operable keys for each of said transmitters for selecting desired outgoing channels and controlling said last mentioned means, and means operative on the selection of a busy outgoing channel by the operation of one of said keys to register the selection, the operated key thereupon being releasable and to automatically establish the corresponding transmitting path following the transmission of an end-of-message signal over the busy channel.

16. In a telegraph switching system, a plurality of signal transmitters adapted to transmit message groups of signals stored in associated control mediums wherein each message group of signals is separated by an end-of-message signal, a plurality of outgoing signal transmitting channels, switching means for establishing signal transmission paths between each of said transmitters and any one of said channels, a plurality of manually operable keys for each of said transmitters for selecting desired outgoing channels and controlling said last-mentioned means, and means for busying an outgoing channel on the establishment of a path thereto and means on the selection of a busy channel by one or more other transmitters to automatically establish paths in turn between said transmitters and said channel as the same become idle, said keys being releasable following the selection of an idle or busy channel.

17. In combination with a transmitter adapted to control the transmission of permuted character representing groups of impulses, a first relay and a second relay and means controlled during the sequential transmission of the individual impulses of a predetermined code group transmitted by said transmitter and including said first relay for operating said second relay and maintaining the same operated for at least a predetermined period.

18. In a telegraph system, a transmitter for transmitting permuted character representing groups of impulses, a distributor for distributing said impulses to a sending circuit, a character reading device comprising a first relay and a second relay for reading the individual impulses of transmitted characters during the transmission thereof and means controlled by said first and second relays on the detection of a predetermined sequence of characters to halt further operation of said distributor.

19. In a telegraph message switching center, a plurality of incoming and a plurality of outgoing channels, switching means for enabling transmission of messages from any one of said incoming channels to any selected one of said outgoing channels, a signals controlled recording mechanism at said switching center, and means including said mechanism as controlled by received signals for automatically recording only a part of each message switched through said switching center.

20. In a telegraph message switching center, a plurality of incoming and a plurality of outgoing lines, switching means for enabling transmission of messages from any one of said incoming lines to any selected one of said outgoing lines, a recording mechanism at said switching center, means for automatically associating said recording mechanism with said outgoing lines, one at a time, whenever transmission of a message thereto occurs to record transmitted signals, and means for automatically disassociating said mechanism from an outgoing line following the recording of a part of the message.

21. In a telegraph message switching center, a plurality of incoming and a plurality of outgoing lines, switching means for enabling transmission of messages from any one of said incoming lines to any selected one of said outgoing lines, said messages including originating and destination indicating character groups, a smaller number of recording means than the number of outgoing lines at said switching center, and means for automatically associating one of said recording means at a time with an outgoing line to automatically record at least the originating and destination indicating character groups of each message switched through said switching center and to automatically disassociate the same from the associated line in response to transmitted signals.

22. In a telegraph message switching center, a plurality of incoming and a plurality of outgoing lines, switching means for enabling transmission of messages from any one of said incoming lines to any selected one of said outgoing lines, a recording mechanism at said switching center, means for automatically causing said recording mechanism to record a part of each message transmitted to each outgoing line whenever transmission of a message thereto occurs, and means controlled by said recording mechanism for automatically stopping further recording following the recording of a part of a message.

23. In a telegraph message switching center, a plurality of incoming and a plurality of outgoing channels, switching means for enabling transmission of messages from any one of said incoming channels to any selected one of said outgoing channels, means at said switching center for automatically adding supplemental characters to each message switched through said center, a single recording mechanism at said center, and means including said recording mechanism for recording said added supplemental characters and a part of each message switched through said center to a plurality of said outgoing channels.

24. In a telegraph message switching center, a plurality of incoming and a plurality of outgoing lines, switching means for enabling transmission of messages from any one of said incoming lines to any selected one of said outgoing lines, said messages including identifying character groups, means at said switching center for automatically adding incident to a switching operation supplemental character groups to each message switched through said center, and means including a single recording mechanism for recording the identifying and said added supplemental character groups of each message switched through said center to a plurality of said outgoing channels.

25. In a telegraph exchange system comprising a switching center for selectively establishing transmission paths between incoming and outgoing circuits for the transmission of message groups of characters, means for automatically adding identifying characters to each message switched through said center and transmitting the same along with the first part of the representative message, signal recording means, means for copying on said recording means the added identifying characters and a part of the accompanying message, and means controlled by said recording means on the recording of predetermined characters of the message for stopping further recording of the message thereon.

26. In a telegraph exchange system comprising a switching center for selectively establishing transmission paths between incoming and outgoing circuits for the transmission of message groups of characters, a single printing telegraph recorder, and means for automatically associating and disassociating said recorder with said outgoing circuits to record automatically at least the address part of each message switched through said switching center.

27. In a telegraph switching center, a plurality of outgoing circuits over which message groups of characters including address characters are transmitted, a single printing telegraph recorder, means for automatically associating said recorder with said circuits, one at a time, to record at least the said address characters of each message and means controlled by signals transmitted over a circuit for disassociating said recorder therefrom.

28. In a telegraph switching system, incoming and outgoing lines, selective switching apparatus for establishing transmission paths between incoming and outgoing lines, a single printing telegraph recording mechanism, means for associating said recording means with said outgoing lines one at a time to record the signals transmitted thereover, contacts on said mechanism operating in response to predetermined character codes, and means controlled by said contacts when operated in a particular sequence to disassociated said recording mechanism from an outgoing line.

29. In a telegraph switching center, incoming and outgoing transmission circuits, selectively operative apparatus for establishing telegraphic communication paths between said incoming and outgoing circuits, a signal recorder at said center, means for associating said recorder with an outgoing circuit on the establishment of a transmission path thereto to record the signals transmitted, means responsive to a particular sequence of character codes transmitted to an outgoing circuit for disassociating said recorder therefrom, a contact operated by all character codes and means controlled by said contact in the interposition in said sequence of a code foreign thereto to prevent the disassociation of said recorder from an outgoing circuit regardless of the operation of said means in response to the remainder of said sequence.

30. In a telegraph switching center, incoming and outgoing transmission circuits, selectively operative apparatus for establishing telegraphic communication paths between said incoming and outgoing circuits, a signal recorder at said center, means for associating said recorder with an outgoing circuit on the establishment of a transmission path thereto to record the signals transmitted, means responsive to a particular sequence of character codes transmitted to an outgoing circuit for disassociating said recorder therefrom, an alarm device and means operative on the non-transmission of said particular sequence within a predetermined length of time after the association of said recorder with an outgoing circuit to render said alarm device operative.

31. In a telegraph switching system, incoming and outgoing lines, selective switching apparatus for establishing transmission paths between incoming and outgoing lines, recording means, means for associating said recording means with said outgoing line to record the signals transmitted thereover, means responsive thereafter to the transmission of a particular sequence of code combinations for disassociating said recording means from an outgoing line, a normally inoperative alarm device, and means operative on the non-disassociation of said recording means within a predetermined length of time after association thereof with an outgoing line to render said alarm device operative.

32. In a telegraph switching system comprising a switching center having a plurality of incoming and outgoing lines with selectively operative means for establishing transmission paths between said incoming and outgoing lines, a single printing recorder, means operative automatically and concomitantly with the establishment of a transmission path through said switching center to associate said recorder therewith and render the same operative to record signals transmitted over said path and means controlled by said recorder for disassociating the same from a transmitting path.

33. In a telegraph switching system comprising a switching center having a plurality of incoming and outgoing lines with selectively operative means for establishing transmission paths between said incoming and outgoing lines, a plurality of printing telegraph recorders fewer in number than said outgoing lines, means operative with the establishment of transmission paths to said outgoing lines to effect recording of a part of the signals transmitted thereover by said recorders, and means for effecting said recording by predetermined of said recorders when such are idle at the time of establishing said paths.

34. In a telegraph switching system comprising a switching center having a plurality of incoming and outgoing lines with selectively operative means for establishing transmission paths between said incoming and outgoing lines, a plurality of printing telegraph recorders fewer in number than said outgoing lines, means operative with the establishment of transmission paths to said outgoing lines to effect recording of a part of the signals transmitted thereover by said recorders, and means controlled by busy and idle conditions of said recorders for determining which effect the recording.

35. In a telegraph switching system, a plurality of sending circuits extending from a switching center and adapted for the transmission of message character groups thereover, a plurality of printing recorders fewer in number than said sending circuits, means including said recorders for recording a part of each message transmitted from said center and means including a concentrator arrangement of said recorders for effecting the recording on the lowest numbered idle recorder.

36. In a telegraph switching center, a plurality of incoming telegraph circuits, a plurality of outgoing telegraph circuits, selective switching means for establishing transmission paths between said incoming and outgoing circuits for the relaying of messages through said center, said messages including page printer control signals, printing recording means at said switching center, means including said recording means for recording a part of each message relayed through said center and means controlled by page printer control signals of messages transmitted for determining the amount of a message recorded by said recording means.

GEORGE G. LIGHT.

REFERENCES CITED

The following references are of record in the file of this patent:

UNITED STATES PATENTS

| Number | Name | Date |
|---|---|---|
| 1,576,561 | Toomey | Mar. 16, 1926 |
| 1,708,989 | White | Apr. 16, 1929 |
| 1,739,935 | White | Dec. 17, 1929 |
| 1,742,334 | Wicks | Jan. 7, 1930 |
| 1,832,118 | Hershey | Nov. 17, 1931 |
| 1,862,549 | Raymond | June 14, 1932 |
| 1,943,475 | Gurley | Jan. 16, 1934 |
| 1,945,665 | Stewart | Feb. 6, 1934 |
| 2,143,828 | Dirkes | Jan. 10, 1939 |
| 2,186,246 | Kiner | Jan. 9, 1940 |
| 2,193,810 | Wheeler | Mar. 19, 1940 |
| 2,193,812 | Blanton | Mar. 19, 1940 |
| 2,279,295 | Blanton | Apr. 14, 1942 |
| 2,366,733 | Krecek et al. | Jan. 9, 1945 |
| 2,410,540 | Wight et al. | Nov. 5, 1946 |